(12) United States Patent
Vaitheeswaran et al.

(10) Patent No.: US 8,938,475 B2
(45) Date of Patent: Jan. 20, 2015

(54) MANAGING BUSINESS OBJECTS DATA SOURCES

(75) Inventors: Ganesh Vaitheeswaran, Bangalore (IN); Arindam Bhattacharjee, Bangalore (IN); Raghavendra Nagaraja, Bangalore (IN); Manasa Ranjan Tripathy, Banki (IN); Nithin Moolky Kamath, Bangalore (IN); Rahul Kumar Jha, Bangalore (IN)

(73) Assignee: SAP SE, Walldorf (DE)

( * ) Notice: Subject to any disclaimer, the term of this patent is extended or adjusted under 35 U.S.C. 154(b) by 75 days.

(21) Appl. No.: 13/338,027

(22) Filed: Dec. 27, 2011

(65) Prior Publication Data

US 2013/0166598 A1 Jun. 27, 2013

(51) Int. Cl.
 *G06F 17/30* (2006.01)

(52) U.S. Cl.
 CPC .............................. *G06F 17/30566* (2013.01)
 USPC ....................................................... 707/792

(58) Field of Classification Search
 CPC .............................................. G06F 17/30566
 USPC ....................................................... 707/792
 See application file for complete search history.

(56) References Cited

U.S. PATENT DOCUMENTS

| | | | |
|---|---|---|---|
| 5,555,403 A | 9/1996 | Cambot et al. | |
| 6,070,164 A * | 5/2000 | Vagnozzi | 1/1 |
| 6,163,776 A * | 12/2000 | Periwal | 1/1 |
| 6,499,033 B1 * | 12/2002 | Vagnozzi | 1/1 |
| 6,609,123 B1 * | 8/2003 | Cazemier et al. | 1/1 |
| 6,662,188 B1 * | 12/2003 | Rasmussen et al. | 1/1 |
| 7,076,502 B2 * | 7/2006 | Shoup et al. | 1/1 |
| 7,289,997 B1 * | 10/2007 | Kita et al. | 1/1 |
| 7,349,896 B2 | 3/2008 | Chowdhury et al. | |
| 7,630,972 B2 | 12/2009 | Ott et al. | |
| 7,685,105 B2 | 3/2010 | Rosenblum et al. | |
| 7,707,221 B1 * | 4/2010 | Dunning et al. | 707/770 |
| 7,725,453 B1 * | 5/2010 | Chen et al. | 707/711 |
| 7,725,460 B2 | 5/2010 | Seitz et al. | |
| 7,779,039 B2 * | 8/2010 | Weissman et al. | 707/793 |
| 7,962,504 B1 | 6/2011 | Mehanna | |
| 8,108,380 B2 | 1/2012 | Fothergill | |
| 8,112,424 B2 | 2/2012 | Hurst et al. | |
| 8,145,624 B1 | 3/2012 | Srivastava et al. | |
| 8,204,905 B2 | 6/2012 | Kuo et al. | |
| 8,311,975 B1 * | 11/2012 | Gonsalves | 707/606 |
| 8,762,420 B2 * | 6/2014 | Brown et al. | 707/803 |
| 2001/0037495 A1 * | 11/2001 | Kato et al. | 717/5 |

(Continued)

OTHER PUBLICATIONS

"Inverted Index," Wikipedia, the free encyclopedia, old revision, Dec. 26, 2010, accessed Jul. 18, 2013, pp. 1-3.*

(Continued)

*Primary Examiner* — Fred Ehichioya
*Assistant Examiner* — Richard Bowen
(74) *Attorney, Agent, or Firm* — Fish & Richardson P.C.

(57) ABSTRACT

Methods, non-transitory computer-readable media, and systems for managing business objects data sources. Multiple business objects data sources, each storing multiple data items, are accessed. For each data source, multiple computer-searchable index documents and multiple metadata tables, including master tables and mapping tables, are generated. The multiple computer-searchable index documents and the multiple metadata tables are provided to perform a search for data items in the multiple business objects data sources.

27 Claims, 13 Drawing Sheets

(56) References Cited

U.S. PATENT DOCUMENTS

| | | |
|---|---|---|
| 2003/0135495 A1* | 7/2003 | Vagnozzi ............................. 707/3 |
| 2004/0194141 A1 | 9/2004 | Sanders |
| 2004/0230571 A1 | 11/2004 | Robertson |
| 2004/0260694 A1 | 12/2004 | Chaudhuri et al. |
| 2005/0203876 A1* | 9/2005 | Cragun et al. ...................... 707/3 |
| 2005/0286102 A1 | 12/2005 | Lieske |
| 2006/0149712 A1* | 7/2006 | Kindsvogel et al. ............... 707/3 |
| 2007/0027904 A1 | 2/2007 | Chow et al. |
| 2007/0156655 A1* | 7/2007 | Butler et al. ....................... 707/3 |
| 2008/0215564 A1* | 9/2008 | Bratseth ............................. 707/5 |
| 2009/0182724 A1* | 7/2009 | Day et al. ........................... 707/5 |
| 2010/0023496 A1* | 1/2010 | Mohan ............................... 707/4 |
| 2010/0057745 A1* | 3/2010 | Li ..................................... 707/10 |
| 2010/0293174 A1 | 11/2010 | Bennett et al. |
| 2011/0219008 A1* | 9/2011 | Been et al. ..................... 707/742 |
| 2012/0011138 A1* | 1/2012 | Dunning et al. .............. 707/758 |
| 2012/0117116 A1 | 5/2012 | Jacobson et al. |
| 2012/0185507 A1 | 7/2012 | Paparizos et al. |
| 2012/0215766 A1* | 8/2012 | Gorelik .......................... 707/722 |
| 2012/0226679 A1 | 9/2012 | Gollapudi et al. |

OTHER PUBLICATIONS

Mohan et al., "Single table access using multiple indexes: optimization, execution, and concurrency control techniques," Proceedings of the international conference on extending database technology on Advances in database technology, p. 29-43, Mar. 1990, Venice, Italy.*

Gonzalez et al. "Google Fusion Tables: Data Management, Integration and Collaboration in the Cloud," Proceedings of the 1st ACM symposium on Cloud computing, Jun. 10-11, 2010, pp. 175-180.*

Narasimhaiah Gorla, "Features to Consider in a Data Warehousing System" Communications of the ACM, vol. 46, No. 11, Nov. 2003, 5 pages.

* cited by examiner

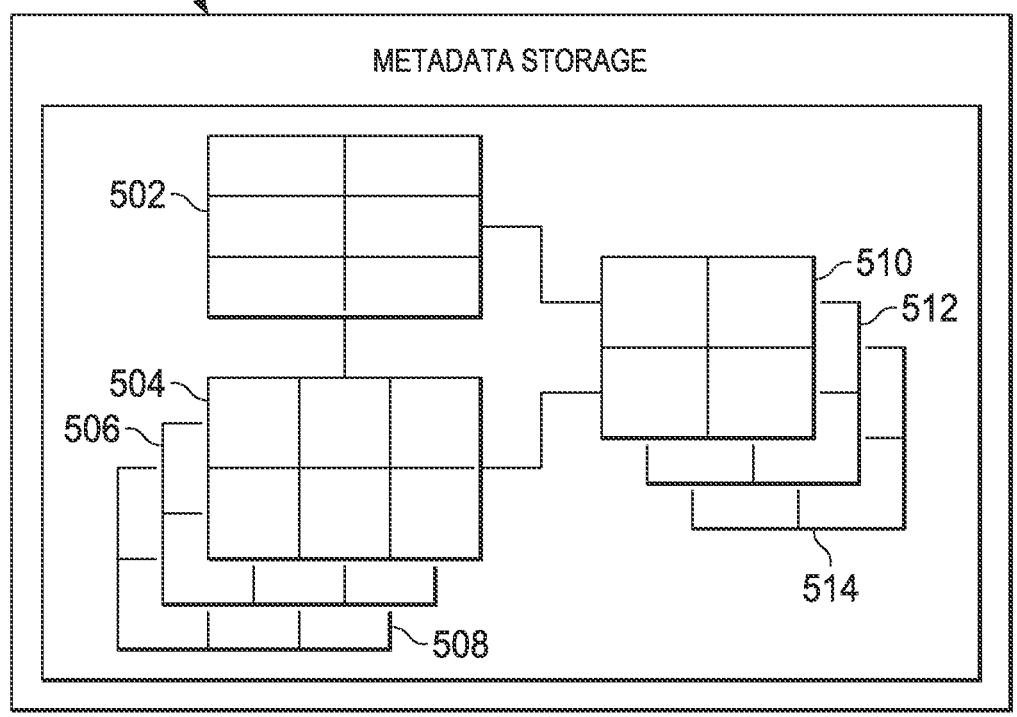

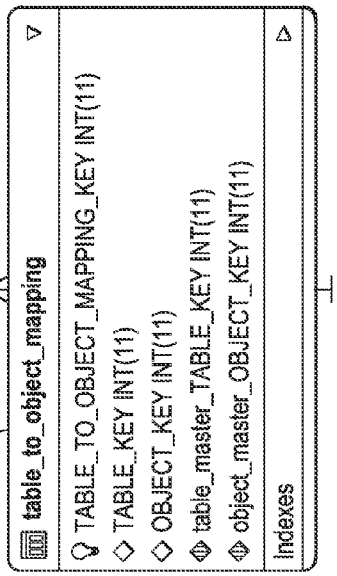
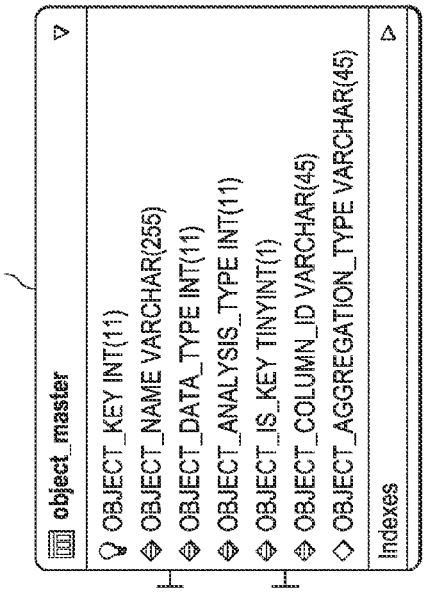
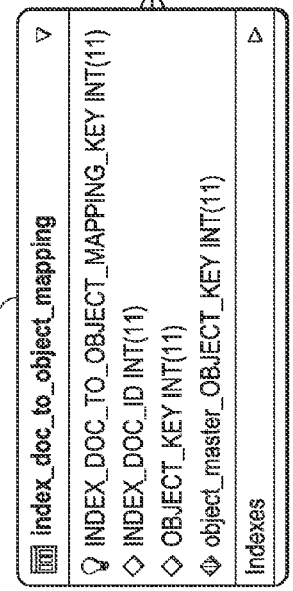
FIG. 6B-2

MANAGING BUSINESS OBJECTS DATA SOURCES

TECHNICAL FIELD

The present disclosure relates to software, computer systems, and computer-implemented methods to search for and provide data.

BACKGROUND

Business organizations perform operations, transactions, and business processes using computer software applications, for example, enterprise software. Using enterprise software, a business organization can process large quantities of data distributed across many business objects data sources. For example, a business objects data source can be a computer-readable repository connected to computer systems that implement the enterprise software through wired or wireless networks, for example, the Internet. The data items can be stored in the data sources in one or more of multiple formats, for example, flat files, Structured Query Language (SQL) databases, spreadsheets, comma-separated value (CSV) files, and other business intelligence artifacts.

The enterprise software can enable users to obtain all or portions of the data items stored in one or more business objects data sources, and to analyze the obtained data items to make business-related decisions. For example, to search for data items stored in one or more of the business objects data sources, a user can specify types of data items, such as metadata associated with the data items, which the user prefers to view. The user can provide the specified types of data items to a query designer. In a design phase, the query designer can design a query (for example, an SQL query) that incorporates the metadata of the data items that the user has specified. The designed query can then be executed on the multiple business objects data sources across which the data items are distributed to identify the data items that satisfy the query. The data items can be retrieved and presented to the user, for example, in the form of one or more business reports.

If the user intends to perform a new search for additional or different types of data items relative to a previous search, then the user can provide the additional or different types of data items to the query designer. In a new design phase, the query designer can design a new query that incorporates the additional or different types of data items. Because the user may rely upon the query designer, the user may not be able to directly query the business objects data sources if and when the users wants to do so.

SUMMARY

The present disclosure involves systems, software, and computer implemented methods for searching for data in business objects data sources.

One innovative aspect of the subject matter described here can be implemented as a computer-implemented method to index business objects data sources for searching. Multiple business objects data sources, each storing multiple data items, are accessed. For each business objects data source, multiple computer-searchable index documents are generated. The index documents include a first search index document associated with a respective business objects data source and multiple second search index documents, each associated with each data item of the multiple data items stored in the respective business objects data source. Multiple computer-readable master tables are generated. The master tables include a first master table storing metadata of the respective business objects data source and multiple second master tables, each storing metadata describing the multiple data items stored in the respective business objects data source. The multiple computer-searchable index documents and the multiple computer-readable master tables are provided to perform a search for data items in the multiple business objects data sources.

This, and other aspects, can include one or more of the following features. Multiple computer-readable mapping tables, each mapping table storing mapping associated with the respective business objects data source, can be generated and provided to perform the search for data items. The respective business objects data source can be represented in a table format that includes one or more tables, each table including one or more columns, each column including one or more cells, and each cell storing a data item of the plurality of data items stored in the respective business objects data source. Generating the multiple computer-searchable index documents can include generating a respective first search index document for each table, generating a respective second search index document for each cell, and generating a respective third search index document for each column. The multiple computer-searchable index documents can be stored in an inverted index data structure. In the first master table, a name of the respective business objects data source and identifier that uniquely identifies the respective business objects data source can be stored. A third master table storing metadata of the one or more tables can be generated. In the third master table, a name of each of the one or more tables can be included. In each second master table, a data type and an analysis type of each data item of the multiple data items stored in the respective business objects data source can be stored. Generating multiple computer-readable mapping tables, each mapping table storing mapping associated with the respective business objects data source, can include generating a table-to-table mapping tables storing join data, generating a table-to-object mapping table storing a mapping between a particular table and one or more columns included in the particular table, generating an index document-table mapping table storing mapping between a particular index document and a particular table indexed by the particular index document, generating an index document-object mapping table storing mapping between the particular index document and one or more particular columns in the particular table, and generating a data source-to-table mapping storing mapping between a respective business objects data source and tables including the particular table. At least a portion of the multiple computer-searchable index documents and at least a portion of the multiple master tables can be generated in parallel. Alternatively, at least a portion of the master tables and at least a portion of the mapping tables can be generated after and based on at least a portion of the multiple computer-searchable index documents. At least a portion of the multiple master tables can be a duplication of at least a portion of the multiple computer-searchable index documents. The multiple computer-readable master tables and the multiple computer-readable mapping tables can be stored in a relational database. Accessing the multiple business objects data sources, each business objects data source storing multiple data items can include crawling each business objects data source and extracting metadata from each business objects data source.

Another innovative aspect of the subject matter described here can be implemented as a non-transitory computer-readable medium tangibly encoding computer program instructions executable by data processing apparatus to perform operations described here. A further innovative aspect of the subject matter described here can be implemented as a system comprising one or more data processing apparatus, and a non-transitory computer-readable medium tangibly encoding computer program instructions executable by the one or more data processing apparatus to perform operations described here.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

DESCRIPTION OF DRAWINGS

FIG. 5 illustrates an example metadata storage storing metadata associated with multiple business objects data sources.

FIGS. 6A, 6B-1 and 6B-2 are example tables that store metadata.

DETAILED DESCRIPTION

Figure 1:
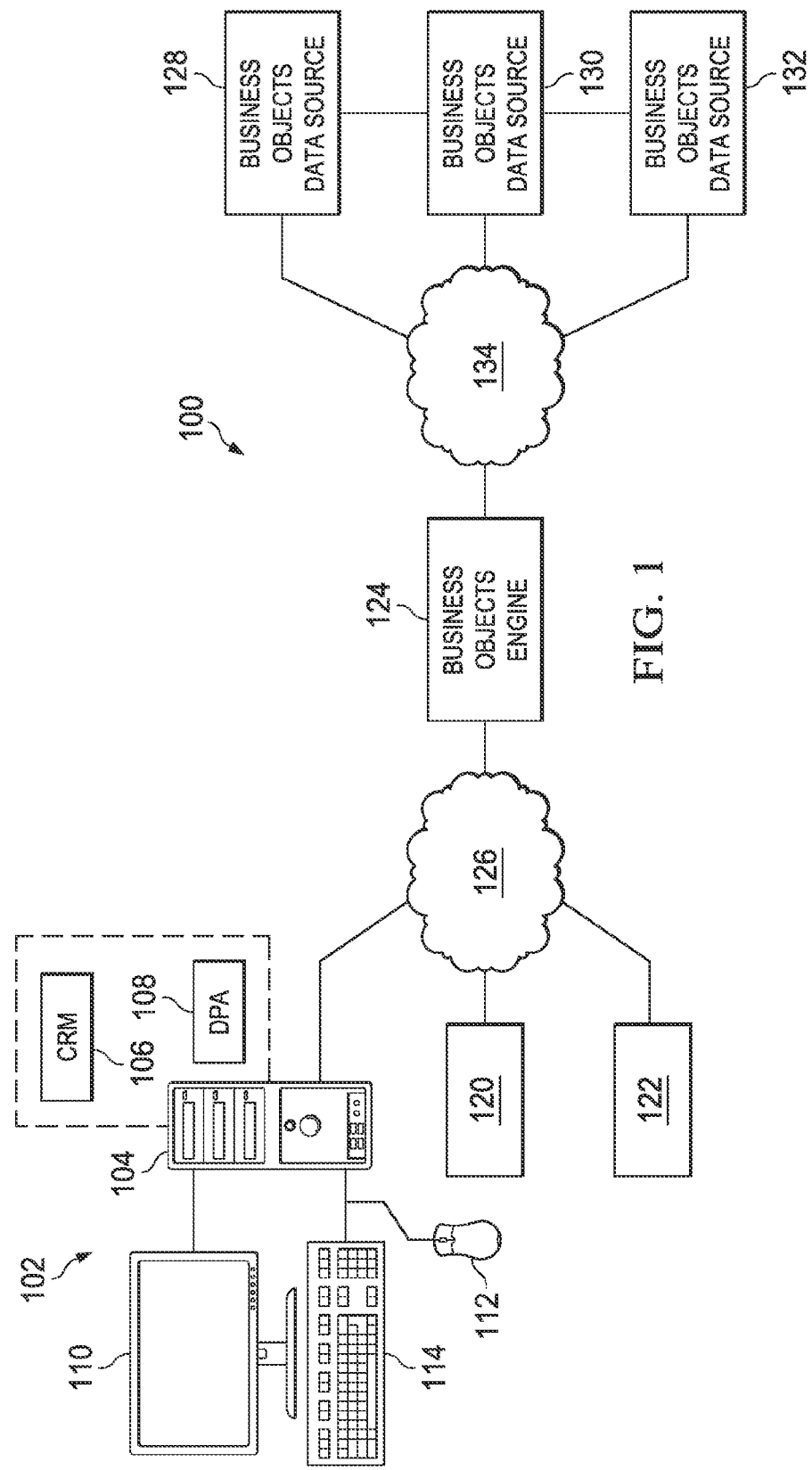
FIG. 1 illustrates an example environment for implementing various features of systems that can index multiple business objects data sources, and search for data items stored in the multiple business objects data sources.

This document describes computer-implemented methods, computer-readable media, and computer systems that implement a search index schema to index business objects data sources and to search for data items stored in the data sources. Each business objects data source can store multiple data items. Further, each business objects data source and the data items stored in each data source can be associated with metadata describing attributes of each data source and each data item. Metadata associated with a data source can include, for example, a name of the data source, a unique identifier to identify a location of the data source, and the like. Metadata associated with a data item can include, for example, a data type (such as, a measure or a dimension), a data source in which the data item is stored, information about a group of data items to which the data item belongs, and the like. The search index schema can enable a user to search the business objects data sources for data items by providing a search query that includes query terms, each of which at least partially represents metadata associated with the data items for which the user is searching. Data items that satisfy the metadata represented by the query terms can be identified, and provided to the user in response to receiving the search query. In some implementations, a data source can be formed from an abstraction layer that overlies one or more data sources. The abstraction layer, which can be implemented, for example, by Semantic Abstraction, can add metadata to the data items in the data source or data sources. The abstraction layer can allow users to query the data sources via means other than a query (for example, an SQL query), for example, using a supply of a set of business objects.

The techniques described in this document offer numerous potential advantages. Data items stored in business objects data sources can be automatically extracted and made available for indexing. The extracted data items can be indexed and made available for searching. A user can search for data items by providing a search query including one or more query terms (for example, text terms). In response, the user can be provided with one or more queries, each representing metadata containing entities in which the user is likely to be interested. Multiple such queries can be ranked based on the query provided by the user.

Data items stored in the multiple business objects data sources can be queried based on the one or more queries, and provided (for example, displayed) to the user in one or more visualization schemes (for example, reports, charts, and the like). The user can browse the entities and relationships to identify new and related insights. The user can also focus the analytical results using entity values. Business intelligence artifacts (such as, reports, charts, and the like) that match the user's search query and that were previously generated in a prior search operation can be provided to the user.

In addition, the data preparation stage can be implemented prior to receiving search queries, thereby reducing delays between a time when the user provides a search query and a time when reports of data items that satisfy the search query are provided to the user. The schema can also enable a user to directly query multiple business objects data sources without requiring prior knowledge of data sources, thereby minimizing or potentially eliminating a need for a design phase. In addition, the ability to directly query the business objects data sources can enable the user to perform ad hoc analysis of data items in substantially real-time, i.e., with negligible delay between a time when the user specifies a search query and when the user is provided with search results. Moreover, relationships can be established across data sources by inducing foreign keys artificially, thereby allowing users to seamlessly perform analysis (such as data correlation) across multiple business objects data sources.

FIG. 1 illustrates an example distributed computing environment 100 ("environment") for implementing various features of systems that can index multiple business objects data sources, and search for data items stored in the multiple business objects data sources. Multiple client systems (for example, a first client system 102, a second client system 120, a third client system 122, and the like) can be connected to a business objects engine 124 through one or more wired or wireless networks 126, for example, the Internet. The business objects engine 124 can be connected to multiple business objects data sources (for example, a first data source 128, a second data source 130, a third data source 132, and the like) through one or more wired or wireless networks 134, for example, the Internet.

A client system, for example, the first client system 102 can be a desktop computer, a laptop computer, a tablet computer, and the like, which includes a computer system 104. The computer system 104 includes a computer-readable medium 106 that stores computer program instructions executable by data processing apparatus 108 to perform the operations described below. A user can provide input to the computer system 104 using input devices, for example, a mouse 112, a keyboard 114, a touch screen, a stylus, a camera, a microphone, and the like, and view an output on an output device, for example, the display device 110. As described below, the business objects engine 124 can prepare the business objects data sources (the first data source 128, the second data source 130, the third data source 132, and the like) for searching by generating a search index and metadata tables. The user can provide a search query to the business objects engine 124 to search for data items stored in the business objects data sources. The business objects engine 124 can identify data items that satisfy the search query using the search index and the metadata tables.

Each of the client systems (the second client system 120, the third client system 122, and the like) can be substantially similar to the first client system 102. Each business objects data source can store multiple data items in one or more of multiple formats—flat files, SQL databases, CSV files, spreadsheets, or combinations of them. In addition, each business objects data source can store metadata associated with a respective data source and with each of the multiple data items stored in the respective data source. Each data source can provide data items or the metadata (or both) in response to requests from the business objects engine 124.

The business objects engine 124 can include a computer-readable medium storing computer program instructions executable by data processing apparatus to implement the search index schema described here. The business objects engine 124 can broadly implement the search index schema in three stages. In a data preparation stage (FIGS. 2-7), the engine 124 can prepare the multiple business objects data sources and data items stored in each of the data sources for searching. In a search stage (FIGS. 8, 9A-9C), the engine 124 can receive a search query including query terms from the user, and, in response, can identify metadata associated with data sources and data items that satisfy the query. In a data retrieval stage (FIGS. 11A, 11B), the engine 124 can search for one or more business objects data sources that satisfy the identified metadata for one or more data items that also satisfy the identified metadata. The engine 124 can retrieve the identified data items and provide the retrieved items to the user in response to receiving the search query (FIGS. 9A, 9B).

In the data preparation stage, the business objects engine 124 can access multiple business objects data sources (for example, a first data source 128, a second data source 130, a third data source 132, and the like). For each business objects data source, the business objects engine 124 can generate a computer-searchable index that includes multiple index documents. For example, the index documents include a first search index document associated with a respective business objects data source—for example, the first data source 128—and multiple second search index documents, each second search index document associated with each data item of the multiple data items stored in the respective business objects data source. Also, the business objects engine 124 can generate multiple computer-readable master tables storing metadata of the respective business objects data source and metadata describing multiple data items stored in the respective business objects data source. The business objects engine 124 can provide the multiple computer-searchable index documents and the multiple computer-readable master tables to perform a search for data items in the multiple business objects data sources. Data preparation is a continuous process that ensures that any change in the business objects data sources are reflected in the index documents and metadata tables.

In the search stage, the business objects engine 124 can receive a search query, for example, from a client system (for example, a first client system 102, a second client system 120, a third client system 120, and the like) that includes one or more query terms. Each query term at least partially represents metadata associated with at least one business objects data source of multiple business objects data sources (for example, a first data source 128, a second data source 130, a third data source 132, and the like). For each query term, the business objects engine 124 identifies one or more business objects data sources that are each associated with metadata at least partially represented by a respective query term by searching the multiple computer-searchable index documents. For each query term, the business objects engine 124 also identifies metadata associated with the identified one or more business objects data sources by searching the multiple master tables. The business objects engine 124 searches one or more business objects data sources to identify data items stored in the searched one or more business objects data sources for data items that satisfy the identified metadata. The business objects engine 124 provides the data items that satisfy the identified metadata in response to receiving the search query, for example, to the client system from which the query was received.

Figure 2:
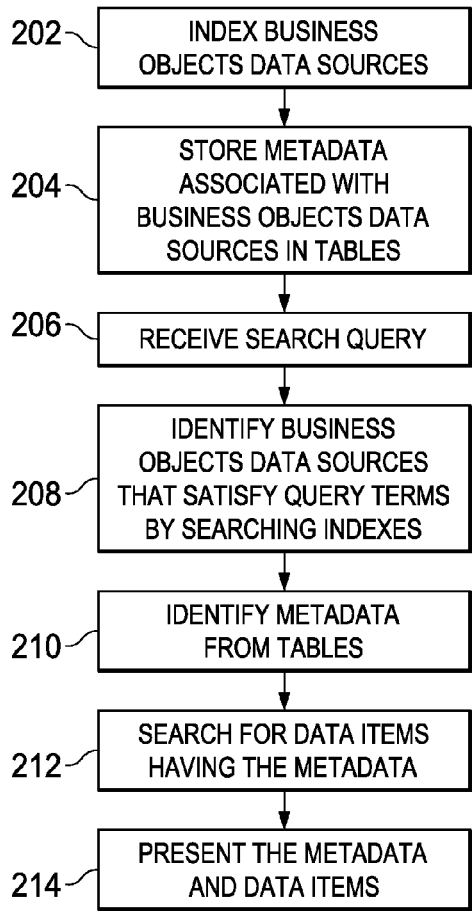
FIG. 2 is a flowchart of an example process implemented by the systems illustrated in FIG. 1.

FIG. 2 is a flowchart of an example process 200 implemented by the systems illustrated in FIG. 1. The process 200 can be implemented as a non-transitory computer-readable medium storing computer program instructions executable by data processing apparatus to perform the operations. For example, the process 200 can be implemented by the business objects engine 124. At 202, business objects data sources can be indexed. At 204, metadata associated with business objects data sources can be stored in respective tables. At 206, a search query can be received. At 208, business objects data sources that satisfy query terms included in the search query can be identified by searching the index documents. At 210, metadata associated with the business objects data sources identified at 208 can be identified from tables. At 212, data items having the metadata identified at 210 can be searched in the multiple business objects data sources. At 214, the metadata and the data items can be presented in response to receiving the search query at 206. Each of the operations implemented in process 200 is described in detail with reference to the following figures.

Figure 3:
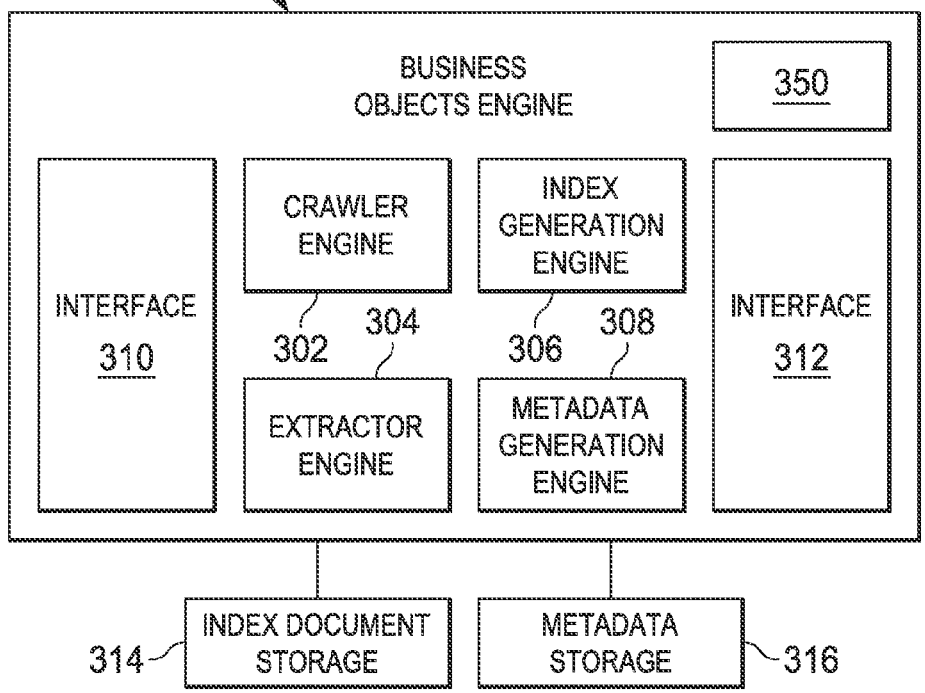
FIG. 3 illustrates an example business objects engine that generates search index documents and metadata information associated with the multiple business objects data sources.

FIG. 3 illustrates an example business objects engine 124 that generates search index documents and metadata information associated with the multiple business objects data sources. The engine 124 can include multiple components, for example, computer software modules, some of which are described below. The components described below can be implemented as a respective non-transitory computer-readable medium storing computer program instructions executable by data processing apparatus to perform operations.

The engine 124 can include a crawler engine 302 that can access and crawl the multiple business objects data sources and make the data sources available for indexing. In addition, the crawler engine 302 can monitor the data sources for any updates—additions, deletions, modifications—to the data items stored in the data sources, and to make the updates available for indexing. In this manner, the crawler engine 302 can identify data sources that store data items that satisfy a search query. The engine 124 can crawl the multiple business objects data sources, implement other features of the data preparation stage, and implement the search stage in parallel.

The engine 124 can further include an extractor engine 304 that can extract data from the business objects data sources that the crawler engine 302 has crawled and identified. The extractor engine 304 can convert a format of a business objects data source into a table format that includes one or more tables, each table including one or more columns. By doing so, the extractor engine 304 can logically represent the multiple data items in one or more columns in a computer-readable storage (for example, a memory). Each column can include one or more cells, and each cell can store a data item stored in a business objects data source. Such a logical representation can hide the details of a business objects data source format from the index generation engine 306 (described below). As such, the extractor engine 304 need not create actual table structures in the memory to store the data items in columns and cells. Instead, the extractor engine 304 can create a logical representation that is substantially similar to a table representation.

In this manner, the extractor engine 304 can abstract the data items in the data sources into an index structure of the index schema. For example, regardless of the structure of the business objects data source that stores data items—flat files, SQL databases, CSV files, spreadsheets, and the like—the extractor engine 304 can map the data items stored in the data source into a table form that includes multiple columns and rows defining cells, each of which includes a respective data item. To do so, each data source can have a corresponding extractor plug-in, which can recognize the structure of the business objects data source, and map the data structure of the source into a structure of the index schema. In this manner, the extractor engine 304 can abstract data items in multiple business objects data sources into multiple tables with a set of columns and a set of rows.

The engine 124 additionally can include an index generation engine 306 that can create a search index that includes multiple index documents from content extracted by the extractor engine 304. In some implementations, the index generation engine 306 can generate a first search index document—an entity metadata index document—associated with each business objects data source, and multiple second search index documents—multiple attribute metadata and attribute value index documents—associated with each data item of the multiple data items stored in the respective business objects data source. The engine 124 can perform text-based search of the multiple business objects data sources using the search index created by the index generation engine 306. The search index is a data structure designed to allow fast searches on large amount of data. In some implementations, the data structure implemented by the index generation engine 306 can be an inverted data structure, for example, the Lucene data structure. In an index document, data can be stored in the form of logical entities called documents. Each index document can include a set of fields and each field can include a name-value pair. The index generation engine 306 can map information describing multiple business objects data sources to different documents and fields in the index. The index generation engine 306 can define the search index in such a way that when a user enters a query, the business objects engine 124 can find a match regardless of the business objects data source that stores data items that satisfy the query.

The engine 124 also can include a metadata generation engine 308 that generates tables that store metadata information about each business objects data source, the relationships between the data sources, and metadata information about each data item in each business objects data source. For example, the metadata generation engine 308 can generate a first master table storing metadata associated with the respective business objects data source and multiple second master tables, each storing metadata describing the multiple data items stored in the respective business objects data source. In some implementations, the master table can store information about business objects data sources, tables, columns, and cells in which data items are stored, and the relationships between the tables. In some implementations, the metadata generation engine 308 can store the relationships between the tables in one or more mapping tables described below.

The search index can be a set of files on a file system. The master tables and the mapping tables are relational databases that are associated with the search index. The master tables and the mapping tables can enhance a speed with which the business objects engine 124 can search and retrieve metadata associated with multiple business objects data sources and data items stored in the data sources. Relative to a search index, retrieving metadata using the master tables and the mapping tables is less expensive and faster because querying a database to retrieve data can be faster than querying a search index to do the same. For example, an implementation of a search process may include executing a search query to find index documents that include the metadata represented by terms in the search query. In response, index document identifiers may be obtained. Without a metadata database including the master tables and the mapping tables, each index document may need to be opened to read metadata field values. If, instead, the metadata field values can be obtained by accessing the master tables and the mapping tables, which can be computationally less intensive and consequently less expensive relative to opening each index document.

The index documents included in the search index generated by the index generation engine 306 and the metadata generated by the metadata generation engine 308 can be stored in an index document storage 314 and a metadata storage, respectively, each of which can be a computer-readable storage medium. The storages (index document storage 314 and metadata storage 316) can be physically located as part of or separate from the business objects engine 124. The business objects engine 124 can additionally include a client system interface 310 and a data source interface 312 that connects the components of the engine 124 with the multiple client systems (for example, the first client system 102) and the multiple business objects data sources (for example, the first data source 128), respectively. The business objects engine 124 additionally includes a search engine 350 that can search the index document storage 314 and the metadata storage 316 as described below with reference to FIGS. 7 and 8.

Figure 4:
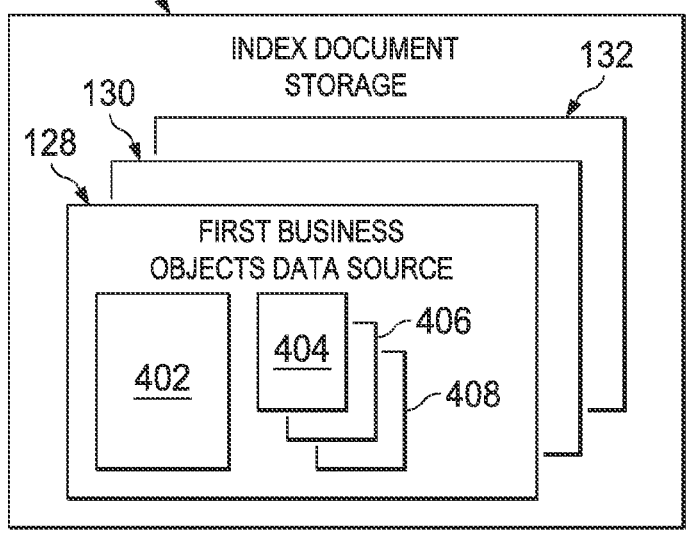
FIG. 4 illustrates an example index documents storage storing multiple index documents, each associated with a business objects data source.

FIG. 4 illustrates an example index documents storage 314 storing multiple index documents, each associated with a business objects data source. Exemplary implementations of data preparation by the business objects engine 124 are described with reference to a relational database. The business objects engine 124 can be configured to search directly on any type of business objects data sources, for example, a data warehouse, a relational database, and the like.

As described above, the multiple business objects data sources are crawled to identify the data sources that need to be indexed. A user can specify a data source configuration, for example, a relational database which includes a set of tables, a file system location which includes a set of spreadsheets, a content management system which includes a set of spreadsheets, or the like. Thus, multiple types of data sources can be available for crawling. The crawler engine 302 can find the different types of files in the file system location and identify the files—for example, CSV files or spreadsheet files—from which data can be extracted. The crawler engine 302 can crawl the multiple business objects data sources continuously or periodically or both to capture updates to data.

The extraction engine 304 can abstract any data source into a table structure. For example, the extraction engine 304 can abstract a CSV file or a spreadsheet into a set of tables. A table can have at least three structural elements—the table itself, a set of columns each including multiple cells, and each cell that stores a value of a data item. As such, data items included in the data source need not be stored in the table structure, i.e., in tables including rows, columns, cells, and the like. However, in some implementations, the data items in one or more data sources may be stored in the table structure.

For each business objects data source, the index generation engine 306 can generate three types of index documents—an entity metadata index document (entity metadata), such as index document 402, an attribute metadata index document (attribute metadata), such as index document 404, and an attribute value index document (attribute value), such as index documents 406, 408. The entity metadata is an index of metadata associated with a business objects data source. The business objects data source, which can be in any format (for example, an Extensible Markup Language (XML) document), can be logically represented in a table structure that includes multiple columns. The index generation engine 306 can generate an attribute metadata for each column in the business objects data source. Each attribute metadata is an index of metadata associated with a respective column. The index generation engine 306 can generate an attribute value for each value in each column. Each attribute value is an index of metadata associated with each cell in each column. In some implementations, the index generation engine 306 can generate the attribute value for each unique value in each column. Thus, the index generation engine 306 can generate a respective first search index, namely, the entity metadata index document, for each table, a respective second search index, for example, an attribute value index document, for each cell, and a respective third search index, for example, an attribute metadata index document, for each column.

In this manner, when the index generation engine 306 indexes a business objects data source, for example, a relational database, the engine 306 can create one index document for each instance of the data source, the columns included in the data source, and the cells included in the columns. For example, if a database included one table and five columns, then the index generation engine 306 can create one index document for entity metadata (for one table), five index documents for every attribute metadata (for five columns), and one index document for every unique value of the non-numeric columns (nominal attribute). By doing so, the index generation engine 306 can categorize the business objects data source so that the search engine 350 can identify a match for a query term by identifying the type of data that the query term represented. An example of a business objects data source including one table with four columns, each including three rows of data is shown in Table 1.

TABLE 1

Example of business objects data source

| Store Name | State | Quantity Sold | Sale Revenue |
|---|---|---|---|
| e-fashion Austin | Texas | 10 | 10000 |
| e-Fashion Boston | Massachusetts | 15 | 15000 |
| e-Fashion Denver | Colorado | 25 | 25000 |

A structure of an entity metadata index document for the table shown in Table 1 is shown in Table 2.

TABLE 2

Entity Metadata Index Document

| Document Type | Table Metadata |
|---|---|
| DbKey | Store Name |
| Table Name | e-fashion Austin |
| Datasource URI | File://c:/.../e-fashion.csv |
| Entity Metadata | efashion_sales |

As shown in Table 2, each document in the index is a set of name value pairs. In every entity metadata table, the index generation engine 306 stores the table name and the data source uniform resource identifier (URI) which uniquely identifies the data source. Multiple tables that have the same name can each be referenced by a respective unique URI. In the example described here, the business objects data source includes one table. Consequently, the index generation engine 306 creates an entity metadata index document. If the business objects data source includes multiple tables, the engine 306 can create an entity metadata index document for each table.

A structure of an attribute metadata index document for a column in the table shown in Table 1 is shown in Table 3.

TABLE 3

Attribute Metadata Index Document

| Document Type | Column Metadata |
|---|---|
| DbKey | Store Name |
| Table Name | e-fashion Austin |
| Datasource URI | File://c:/.../e-fashion.csv |
| Entity Metadata | efashion_sales |
| Attribute Name | Store Name |
| Submitter | Name |
| Analysis Type | Dimension (Nominal)/Measure (Numeric) |
| IsKey | True/False |

The index generation engine 306 can generate a corresponding attribute metadata index document for each of the remaining columns in Table 1.

A structure of an attribute value index document for a cell in each column in the table shown in Table 1 is shown in Table 4.

TABLE 4

Attribute Value Index Document

| Document Type | Column Value |
|---|---|
| DbKey | Store Name |
| Table Name | e-fashion Austin |
| Datasource URI | File://c:/.../e-fashion.csv |
| Entity Metadata | efashion_sales |
| Attribute Name | Store Name |
| Attribute Value | e-fashion Austin |
| Submitter | Name |

The index generation engine 306 can generate a corresponding attribute value index document for each of the cells in each column in Table 1.

In some implementations, the index generation engine 306 can additionally perform stemming to identify root form of words. For example, if index generation engine 306 identifies one or more of "profitability," "profitable," or "profit" as metadata associated with business objects data sources or data items or both, the index generation engine 306 can additionally stem the metadata to determine that "profit" is the root form of each of the metadata. The index generation engine 306 can associate the root form with each metadata. In this manner, the index generation engine 306 can enhance the scope of the search operations described below.

FIG. 5 illustrates an example metadata storage 316 in which the metadata generation engine 308 stores metadata associated with multiple business objects data sources. In the metadata storage 316, the metadata generation engine 308 maintains some metadata associated with the business objects data sources and the data items stored in the sources in multiple tables because the metadata generation engine 308 and one or more other components of the business objects engine 124 can read data from the metadata storage 316 faster than from the index documents storage 314. The metadata generation engine 308 additionally can store relationships between the business objects data sources, the tables into which the data sources were abstracted, and the columns in the tables in the metadata storage 316.

In the metadata storage 316, the metadata generation engine 308 can store a first master table 502 associated with multiple business objects data source and multiple second master tables (tables 504, 506, 508), each second master table storing metadata describing multiple data items stored in respective business objects data sources. For the multiple business objects data sources, the metadata generation engine 308 can additionally store multiple mapping tables (tables 510, 512, 514), each of which stores mapping associated with the business objects data sources in the metadata storage 316. One set of the master tables (described below) include multiple rows, each of which represents one table which is a logical representation of a business objects data source, and thus can uniquely identify the business objects data source. Another set of the master tables (described below) include multiple columns each of which represents each column in each table, and thus can uniquely identify a column in a table.

As described in the examples below, for each business objects data source, the metadata generation engine 308 can store a name of the respective data source and an identifier that uniquely identifies the data source in a corresponding first master table in the metadata storage 316. An example of a first master table is shown in Table 5.

TABLE 5

First Master Table (Data Source Master)

| DataSourceKey | DataSourceURI | DataSourceName | RepoName |
|---|---|---|---|
| 1 | Repo://efashion_sales | Efashion sales | 'de.datadb.config' |

The "DataSourceKey" is an auto-generated integer. The "DataSourceURI" is the unique identifier for the business objects data source and is the same as the URI stored in the index documents described above. The "DataSourceName" is a name under which the user configures the data source and the "RepoName" is the name that the metadata generation engine 308 associates with the data source.

The metadata generation engine 308 can additionally store a third master table that stores metadata of the multiple tables into which the business objects data source has been abstracted in the metadata storage 316. In the third master table, the metadata storage 316 can include a name of each table. An example of a third master table is shown in Table 6.

TABLE 6

Third Master Table (Table Master)

| TableKey | Table Name |
|---|---|
| 1 | Efashion sales |
| 2 | City_details |
| 3 | State_details |
| 4 | Category_details |

Each entry in the third master table represents a table. A mapping table that stores a mapping between each table and the business objects data source is described below. In some implementations, the third master table can be a flat list. The "TableKey" is an auto-generated integer while the "Table Name" is a table name.

In each second master table, the metadata generation engine 308 can store a data type and an analysis type of each data item of the multiple date items stored in the respective business objects data source. An example of a second master table is shown in Table 7.

TABLE 7

Second Master Table (Object Metadata)

| ObjectKey | ObjectName | Data Type | Analysis Type |
|---|---|---|---|
| 1 | Sales_revenue | Integer | Measure |
| 2 | City | String | Dimension |
| 3 | State | String | Dimension |
| 4 | Category | String | Dimension |

Each entry in the second master table can represent a column in one of the multiple tables into which the business objects data source is abstracted. In some implementations, the second master table can be a flat list. The second master table can identify a table to which a column belongs. The "Analysis Type," "Measure," represents a numeric value and "Dimension" represents a context associated with the numeric value. The representations, "Measure" and "Dimension," are column-level metadata. For example, if profit in 2011 is $10,000, then "Profit" can be a column name, "$100,000" may be one of the values in the "Profit" column or an aggregation of all profit values for "Year=2011." In this example, "Year" is a dimension and "Profit" is a measure. The values "2011" and "$100,000" are specific values in these columns. In some implementations, the engine 124 can index all column names, but index only dimension values.

In addition, the metadata generation engine 308 can generate multiple computer-readable mapping tables, each of which stores mapping associated with the respective business objects data source. The mapping tables include a business objects data source-to-table mapping that stores mapping between a data source and one or more tables into which the data source has been abstracted. An example of a data source-to-table mapping is shown in Table 8.

TABLE 8

Data source-to-table Mapping Table

| Datasource_to_table_mapping_key | Datasource_source_key | Table_key |
|---|---|---|
| 1 | 1 | 1 |
| 2 | 1 | 2 |
| 3 | 1 | 3 |
| 4 | 1 | 4 |

The mapping tables include a table-to-table mapping that stores join data between the respective business objects data source and one or more of the remaining business objects data sources. An example of a table-to-table mapping table is shown in Table 9.

TABLE 9

Table-to-table Mapping Table

| Table to table key | Antecedent_table key | Descendent_table key | Antecedent_object key | Descendent_object key |
|---|---|---|---|---|
| 1 | 2 | 1 | 1 | 1 |
| 2 | 3 | 1 | 1 | 1 |
| 3 | 4 | 1 | 1 | 1 |

The mapping tables include a table-to-object mapping that stores mapping between tables and its columns. An example of a table-to-object mapping table is shown in Table 10.

TABLE 10

Table-to-object Mapping Table

| Table_to_object_key | Table key | Object key |
|---|---|---|
| 1 | 1 | 1 |
| 2 | 2 | 2 |
| 3 | 3 | 3 |

The mapping tables include an index document-to-table mapping between the index documents and the table information. Each row in the index document-to-table mapping table represents an index document. The table includes an index document key which matches a unique identifier of a document in the search index. Using this mapping, the business objects engine 124 or the search engine 350 or both can find the table metadata information when an index document satisfies a query term. An example of an index document-to-table mapping table is shown in Table 11.

TABLE 11

Index document-to-Table Mapping Table

| Index_doc_to_table_mapping | Index_document_key | Table Key |
|---|---|---|
| 1 | 1 | 1 |
| 2 | 2 | 2 |
| 3 | 3 | 3 |

The mapping tables include an index document-to-object mapping between the index document and column information. For every column name and column/value in an index document, the business objects engine 124 or the search engine 350 or both can find the object (column) metadata information when an index document satisfies a query term using this mapping. An example of an index document-to-object mapping table is shown in Table 12.

TABLE 12

Index Document-to-Object Mapping

| Index_document_to_object_mapping | Index_document_key | Object Key |
|---|---|---|
| 1 | 4 | 1 |
| 2 | 5 | 2 |
| 3 | 6 | 3 |

Figure 6A:
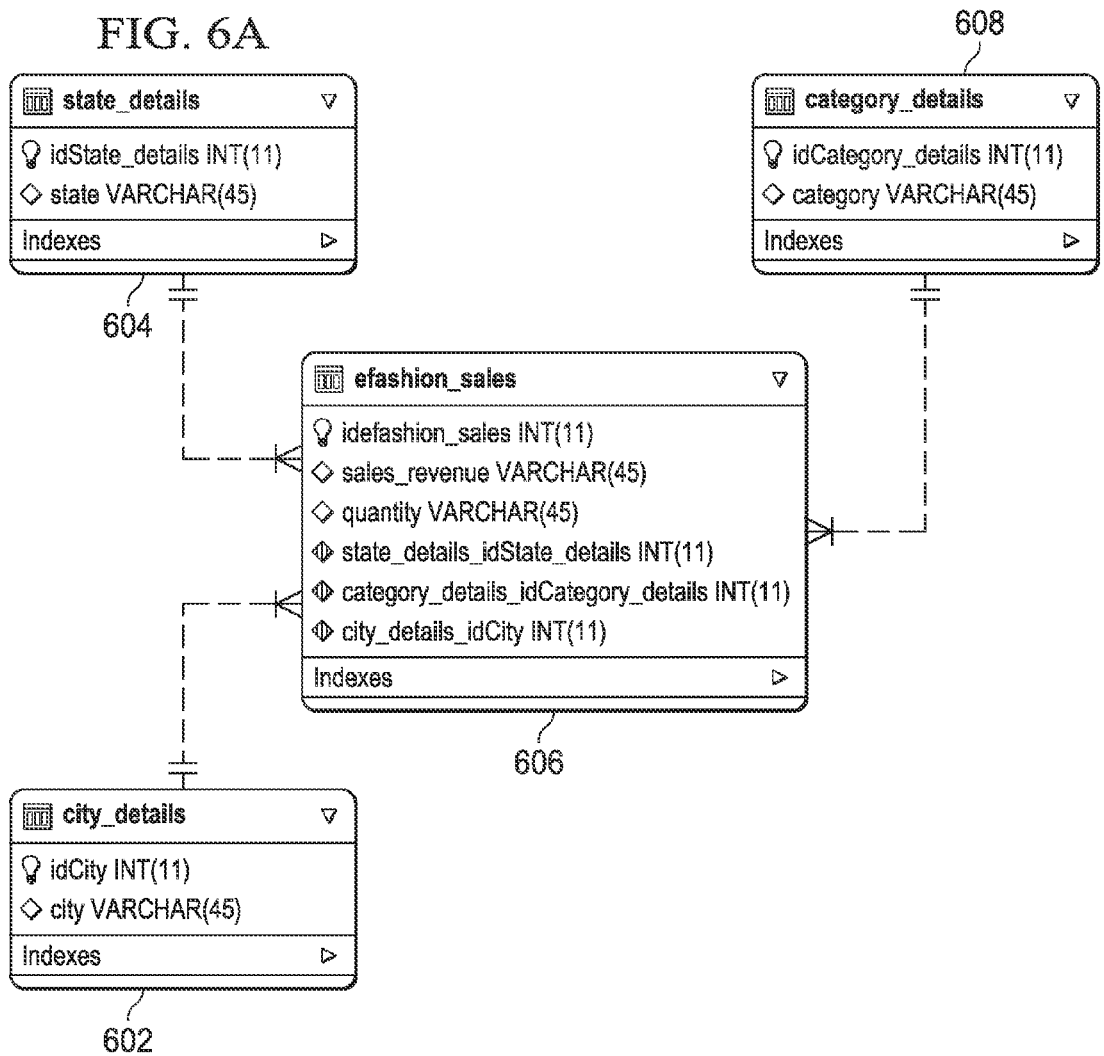
Figures 1, 6B:
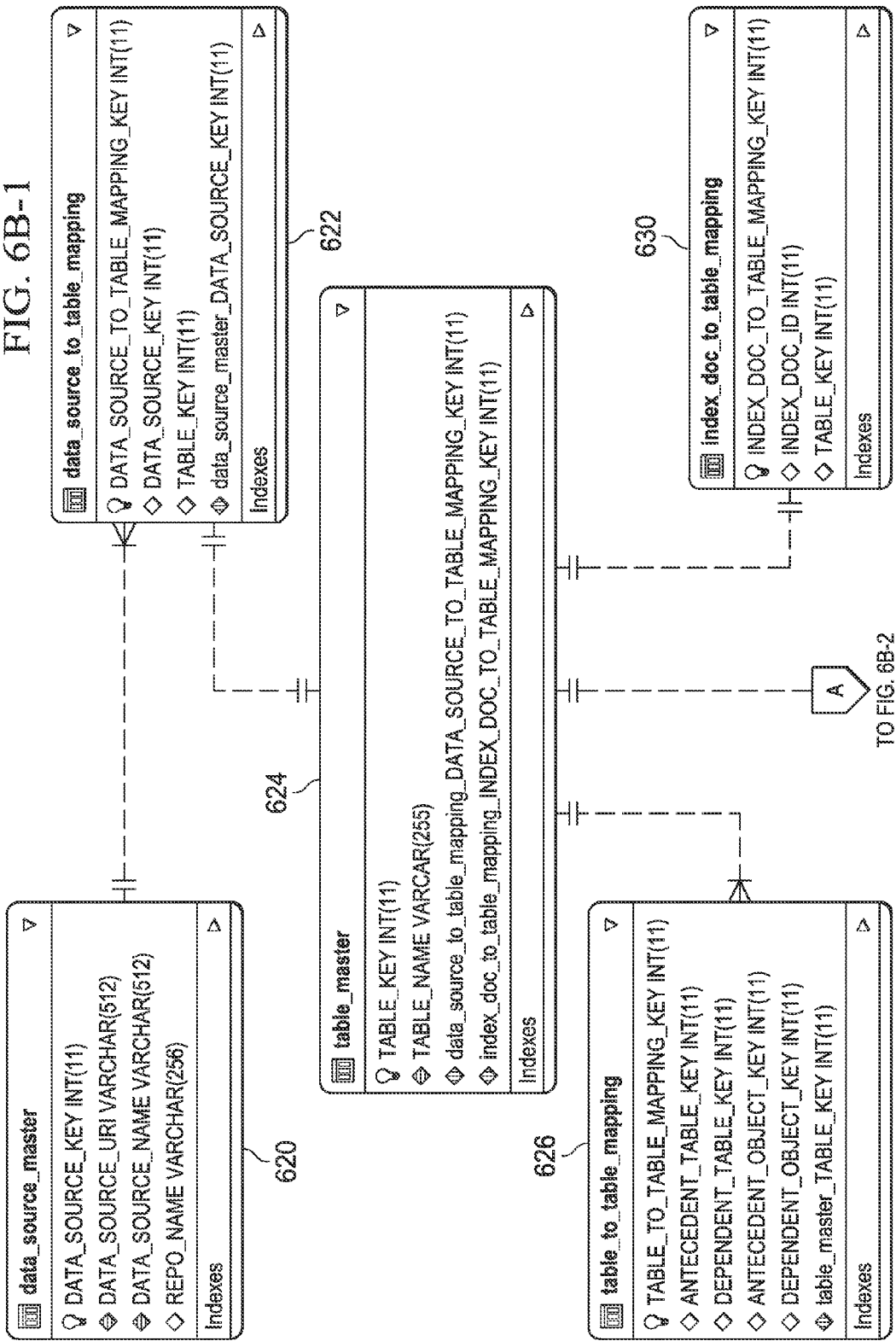

FIGS. 6A and 6B-1 and 6B-2 are example tables that store metadata. FIG. 6A shows an example of a relational database entitled "efashion sales," which is modeled on dimensional modeling, and includes multiple data sources (a first data source 602, a second data source 604, a third data source 606, and a fourth data source 608). FIGS. 6B-1 and 6B-2 show multiple master tables (a data source master table 620, a table master table 624, an object master table 634) and multiple mapping tables (a data source to table mapping table 622, a table to table mapping table 626, a table to object mapping table 628, an index document to table mapping table 630, and an index document to object mapping table 632) that store metadata associated with the "efashion sales" database and the mapping between the tables, respectively.

In some implementations, the index generation engine 306 and the metadata generation engine 308 can generate at least a portion of the multiple search index documents and at least a portion of the multiple tables, respectively, in parallel. In some implementations, the metadata generation engine 308 can generate at least a portion of the master tables and at least a portion of the mapping tables after and based on at least a portion of the search index documents generated by the index generation engine 306. In some implementations, at least a portion of the metadata stored in the master tables can be a duplication of at least a portion of the metadata stored in the search index documents. The business objects engine 124 can store the multiple master tables and the multiple mapping tables in a relational database in the metadata storage 316. In some implementations, instead of storing the indexed values in the metadata tables, the business objects engine 124 instead stores the values in a set of primary files in a specific format associated with the search index, for example, in index documents. The search index is thus a set of files and the values of the indexed files can be retrieved from the primary files that contain a copy of the values that have been indexed.

Figure 7:
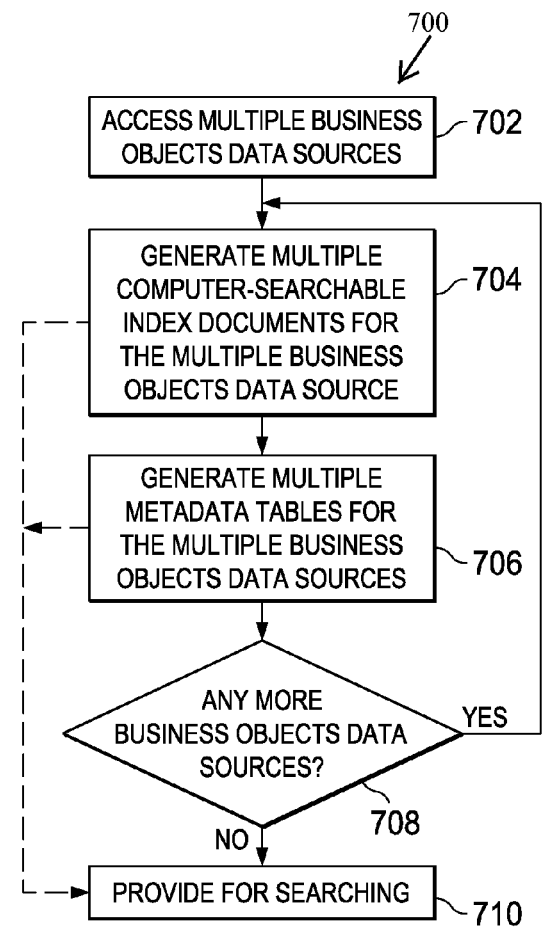
FIG. 7 is a flowchart of an example process for generating index documents and metadata information.

FIG. 7 is a flowchart of an example process 700 for generating index documents and metadata information. The process 700 can be implemented as a non-transitory computer-readable medium storing computer program instructions executable by data processing apparatus to perform the operations. For example, the process 700 can be implemented by one or more components of the business objects engine 124, for example, the index generation engine 306 and the metadata generation engine 308. At 702, multiple business objects data sources can be accessed and crawled. At 704, multiple computer-searchable index documents can be generated for the multiple business objects data sources. At 706, multiple metadata tables including master tables and mapping tables can be generated for the multiple business objects data sources. At 708, a check can be made to determine if any more business objects data sources are available? If additional business objects data sources are available (decision branch "YES"), then, for an additional data source, computer-searchable index documents and master tables can be generated. If no additional business objects data sources are available (decision branch "NO"), then the multiple index document and the multiple master tables can be provided to search for data at 710.

In some implementations, index documents and master tables can be provided to search for data as the index documents and master tables are generated. In other words, all of the multiple index documents and all of the multiple master tables need not be generated prior to providing any of the multiple index documents or any of the multiple master tables to search for data. Instead, the index documents and master tables can be provided as and when they are generated. As described with reference to the following figures, in some implementations, the search engine 350 can receive a search query that includes search terms that each represents data items—for example, metadata associated with data items—stored in the multiple business objects data sources. From the multiple search index documents, the multiple master tables, and the multiple mapping tables, the search engine 350 can identify data items that satisfy the search query.

Figure 8:
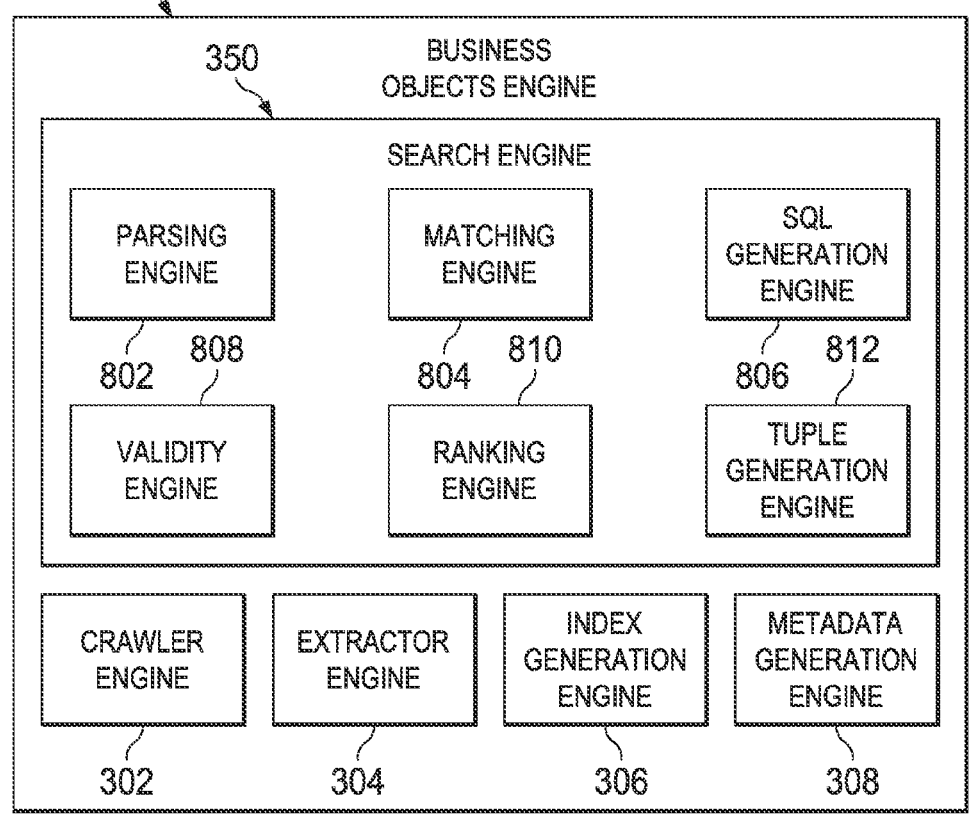
FIG. 8 illustrates an example search engine that searches for data items stored in the multiple business objects data sources.
Figure 9A:
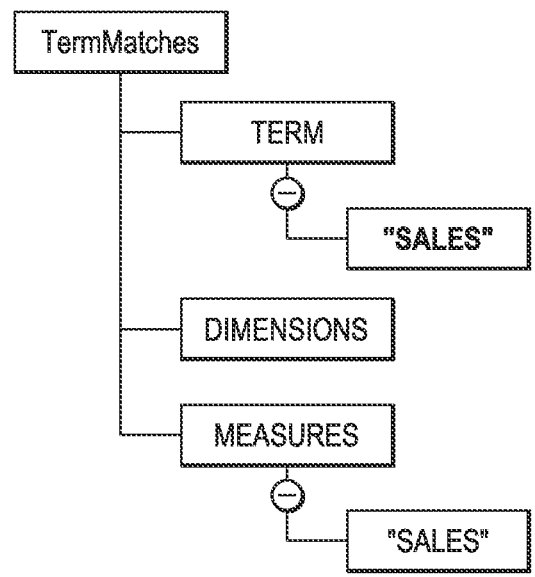
FIGS. 9A-9C show example objects that store metadata associated with searched query terms.
Figure 9B:
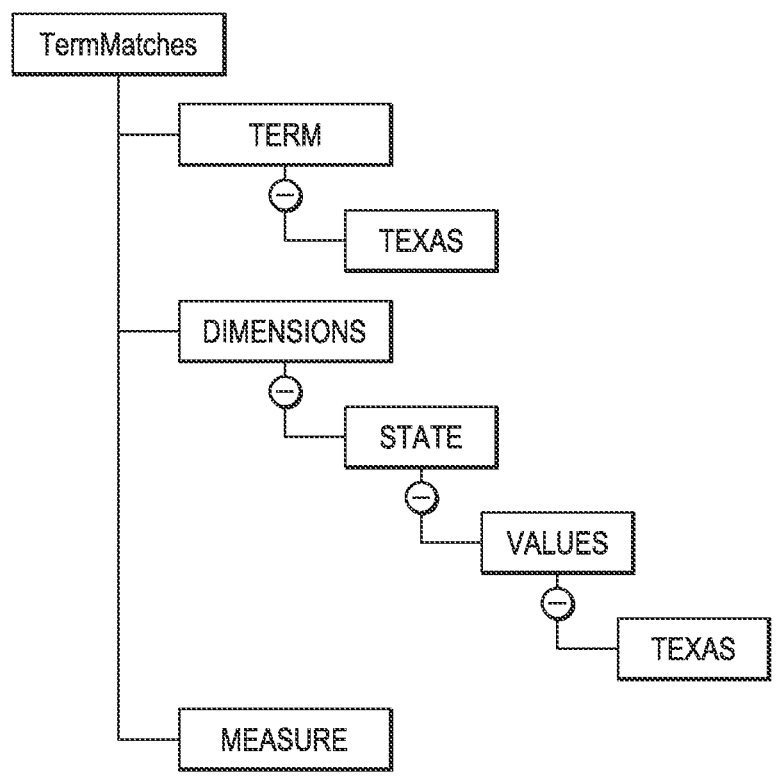

FIG. 8 illustrates an example search engine 350 that searches for data items stored in the multiple business objects data sources. The search engine 350 can receive a search query (for example, a string of text including one or more words separated by a delimiter) from a client system (for example, the first client system 102), and convert the search query into a format that the index generation engine 306 can recognize. The search engine 350 can search the index documents storage 314 and the metadata storage 316 for metadata that satisfies the converted query format. Upon identifying columns that match the search query, the search engine 350 can combine the columns into groups (tuples, described below). Each group can include one or more dimensions and one or more measures. The search engine 350 can confirm that the columns are present in one or more tables and that the columns are related to each other through joins. The search engine 350 can then generate a query, for example, an SQL query, that includes the identified metadata, for each tuple. In another example, if the business objects data sources are implemented in a Business Objects Universe, the search engine 350 can generate a UniverseSDK to query the business objects data source. The search engine 350 can rank the tuples and present the ranked tuples in response to receiving the search query.

In some implementations, the search engine 350 can include a parsing engine 802 to parse the received query. To parse a received query, the parsing engine 802 can separate the received query into one or more individual words, and exclude terms that are not query terms. For example, if the received search query is "sales in Texas," then the parsing engine 802 can split the query into individual words—"sales," "in," Texas"—based on a delimiter between the words (a white space, in this example), and can remove stop words, i.e., words that are not keywords and that do not affect the search ("in," in this example). In this example, the parsing engine 802 can identify "sales" and "Texas" as two keywords in the search query "sales in Texas."

In some implementations, the search engine 350 can include a matching engine 804 that can identify one or more business objects data sources that are each associated with metadata at least partially represented by a respective query term by identifying one or more columns that satisfy the query term. In some implementations, the matching engine 804 can perform a term search to search for matches against column names and column values into which the multiple business objects data sources have been abstracted, and that are stored in the index document storage 314 and the metadata storage 316. The matching engine 804 can search the attribute metadata index document, and the attribute value index document associated with each business objects data source to identify index documents that satisfy each query term determined by the parsing engine 802.

Example operations performed by the matching engine 804 are described with reference to Table 1, which represents an abstraction of a business objects data source that has been indexed, and is reproduced below.

TABLE 1

Example of business objects data source

| Store Name | State | Quantity Sold | Sale Revenue |
|---|---|---|---|
| e-fashion Austin | Texas | 10 | 10000 |
| e-Fashion Boston | Massachusetts | 15 | 15000 |
| e-fashion Denver | Colorado | 25 | 25000 |

When the matching engine 804 searches the attribute metadata index document generated by indexing the data source referenced in Table 1 for the term "sales", the matching engine 804 can find one column match in the "Sale Revenue" column because "Sale" is a root form of "sales". In this example, the matching engine 804 will not find a column match for the term "Texas" because none of the column names include "Texas". When the matching engine 804 searches the attribute value index document generated by indexing the data source referenced in Table 1 for the term "sales", the matching engine 804 will not find any value match because none of the values (i.e., the entries in each cell of the columns) includes the term "sales". However, the matching engine 804 finds a value match for the term "Texas" in a cell in the "State" column.

Upon determining a value match, the matching engine 804 can additionally obtain a column match for the value match by identifying the name of the column in which the value match was found (i.e., "State" in this example). In some implementations, the matching engine 804 can look up the index document-to-object mapping table—such as, for example, Table 12—to identify the column match for a corresponding value match. For example, the match engine 804 can search the attribute value index document—such as, for example, Table 4—to determine a value match, and obtain a set of document identifiers of the index documents that include the metadata of the matching value. The match engine 804 can then search the columns of the index document-to-object mapping table, for example, the index doc key column and the object key column. The index doc key column includes the document identifiers. To do so, the match engine 804 can execute an SQL query to query the mapping table and identify the object keys that correspond to the document identifiers in the index document key column. Using the join data in the data source-to-table mapping table—such as, for example, Table 8—the match engine 804 can search the object master table—such as, for example, Table 7—to determine the data type and the analysis type. In this manner, the matching engine 804 can search the attribute metadata index documents and the attribute value index documents to identify column and value matches as described with reference to the aforementioned example.

As shown in FIGS. 9A and 9B, for each search term—"sales" and "Texas", in this example—the match engine 804 can form a corresponding object (sometimes called a "TermMatch" object) in which the match engine 804 can include the term and the list of dimensions and measures associated with the term. To this object, the match engine 804 can add attribute metadata obtained from the index search. FIG. 9A shows the "TermMatch" object for the query term "sales", which includes "sales" associated with "Term" and "Measures". FIG. 9B shows the "TermMatch" object for the query term "Texas", which includes "Texas" associated with "Term" and with "State" (column name) and with "value". In this manner, the match engine 804 can generate a "TermMatch" object for each query term in the search query, and use the information stored in a "TermMatch" object for each query term to determine meaningful information about the query term. As described below, the meaningful information about the query term is called a tuple, which the search engine 350 uses to search the multiple business objects data sources for data items that satisfy the information included in the tuple.

The search engine 350 can include a tuple generation engine 812 that can identify multiple tuples, each tuple including one or more metadata that matches a respective query term. A tuple is a set of metadata (a first metadata, for example, a measure, and a second metadata, for example, a dimension) which together represent meaningful information in a business objects data source. The tuple represents a set of columns, each column matching one term in the search query. The metadata that is included in a tuple is obtained by searching the search index documents and the mapping tables for metadata (i.e., text) that matches the text of parsed query terms. As described below, an SQL query is generated for each tuple, and each query is then executed against the multiple business objects data sources to identify data items that are associated with the metadata represented by the tuples. While in some implementations, a tuple includes a dimension and a measure, in other implementations, a tuple can include one or more dimensions or one or more measures. In the context of business analysis, a tuple that includes a measure and a dimension may be more meaningful than a tuple that includes two dimensions or a tuple that includes two measures because the measure provides a numeric value associated with business information and the dimension provides contextual information for the numeric value.

For example, the search query "sales in Texas" can be parsed into two query terms—"sales" and "Texas". The term "sales" can match "Sales Revenue" which is a column of numeric values (measures) and "Sales Person" which is a column of names of sales persons (dimensions). Similarly, the term "Texas" can match a value "Texas" in a column named "States" which is a column of dimensions. The tuple generation engine 812 can generate the following tuples from the two query terms—"Sales Revenue, State" and "Sales Person, State". The tuple generation engine 812 can generate both tuples, but the search engine 350 can ignore "Sales Person, State" because it includes two dimensions and consider only "Sales Revenue, State" for searching.

In another example, the search query "sales by store name in Bangalore" can be parsed into three query terms—"sales", "store name", "Bangalore". The term "sales" can match "Sales Revenue" and "Sales Person". The term "store name" can match "Store name". The term "Bangalore" can match the value "Bangalore" and the column "City". In this example, the tuple generation engine 812 can generate the following tuples—"Sales Revenue, Store name, City", "Sales Revenue, Store name," "Sales Revenue, City" such that each generated tuple includes at least one measure and at least one dimension. As described below, tuple generation enables providing data items that satisfy the search query and also enables broadening the scope of search results by providing data items that satisfy one or more portions of the search query.

A pseudo-code for generating tuples is shown below:

1. Load dimension information from database/Index to list dimensions[ ]
2. Load measure information from database/Index to list measures[ ]
3. Load termMathesList from to termMatches[ ]
4. Load Max_tuple_size , Min_tuple_size <- 2
5. Load max_measure_size, min_measure_size <- 2
6. For I Min_tuple_size to Max_tuple_size
    a. For J min_measure_size to max_measure_size
        For K 0 to length(termMatches)
            Call fillTuples(termMatches, measures,dimensions,j)
7. Repeat step 8 for every element in the tuple list
8. Tuple[i].score <- average(object_score) * sum(object_score)
9. Sort tuples based on tuple score , greater the tuple score higher the ranking
10. Function fillTuples(termMatches, measures,dimensions,measure_count)
    10-1. Initialize measureStack[ ]
    10-2. For I 1 to N
        a. If( NOT measureStack.contains(measures[i] )
            i. measureStack.push(measures[i] )
            ii. if(measure_count = length(measureStack)
            iii. call fillDimension(termMatches, measures,dimensions, measureStack)

-continued

```
        b. else
            c. Call fillTuples(termMatches, measures,dimensions, measure_count)
    11. Function fillDimension(termMatches, measures, dimensions, dimnesion_count,
measureStack)
        11-1. Initialize dimensionStack[ ]
        11-2. For I 1 to N
            a. If( NOT dimensionStack.contains(dimensions [i] )
                i. dimensionStack.push(dimensions [i] )
                ii. if(dimnesion_count = length(dimensionStack)
                iii. tuple < - createTuple(dimensionStack, measureStack)
            b. else
            c. Call fillDimension(termMatches, measures,dimensions)
```

In a further example, the search query "sales by store name in Bangalore and project" can return four search hits—"city" for "Bangalore", "Sales Revenue", "Store Name" and "Review group" for "Project". Except for "sales revenue" other search hits are dimensions. The tuple generation engine 812 can implement the following mathematical formula to generate the combinations:

$$\text{Total combinations} = \bigcup_{x=1}^{x=n} nCx,$$

where "n" is number of dimensions.
Applying this formula on a set of dimensions (n=3) in the above query, following combinations are generated.
$_3C_1$={City} {Store name} {Review group}
$_3C_2$={City, Store name} {City, Review group} {Store name, review group}
$_3C_3$={City, Store name, Review group}

$$\bigcup_{x=1}^{x=n} nCx = \{City\} \{Store\ name\} \{Review\ group\}$$

{City, Store name} {City, Review group}

{Store name, review group}

{City, Store name, Review group}

For every combination thus generated, the tuple generation engine 812 can add measure ("Sales Revenue" in this example) to form a set of tuples as shown below:
T1={City, Sales revenue}
T2={Store Name, Sales revenue}
T3={Review group, Sales revenue}
T4={City, Store name, Sales revenue}
T5={City, Review group, Sales revenue}
T6={Store name, review group, Sales revenue}
T7={City, Store name, Review group, Sales revenue}
A pseudo-code for generating combinations of tuples is shown below:

```
    1. Function getCombination (list)
    2. If size (list) < 1
    3.       return
    4. Else
    5.       For I 1 to n by 1
    6.       Do
    7.            tempList[ ] <- list[ ]
```

-continued

```
    8.            Remove tempList[i] from tempList[ ]
    9. Call getCombination (tempList)
    10. Combination[ ] <- tempList[ ]
```

Figure 9C:
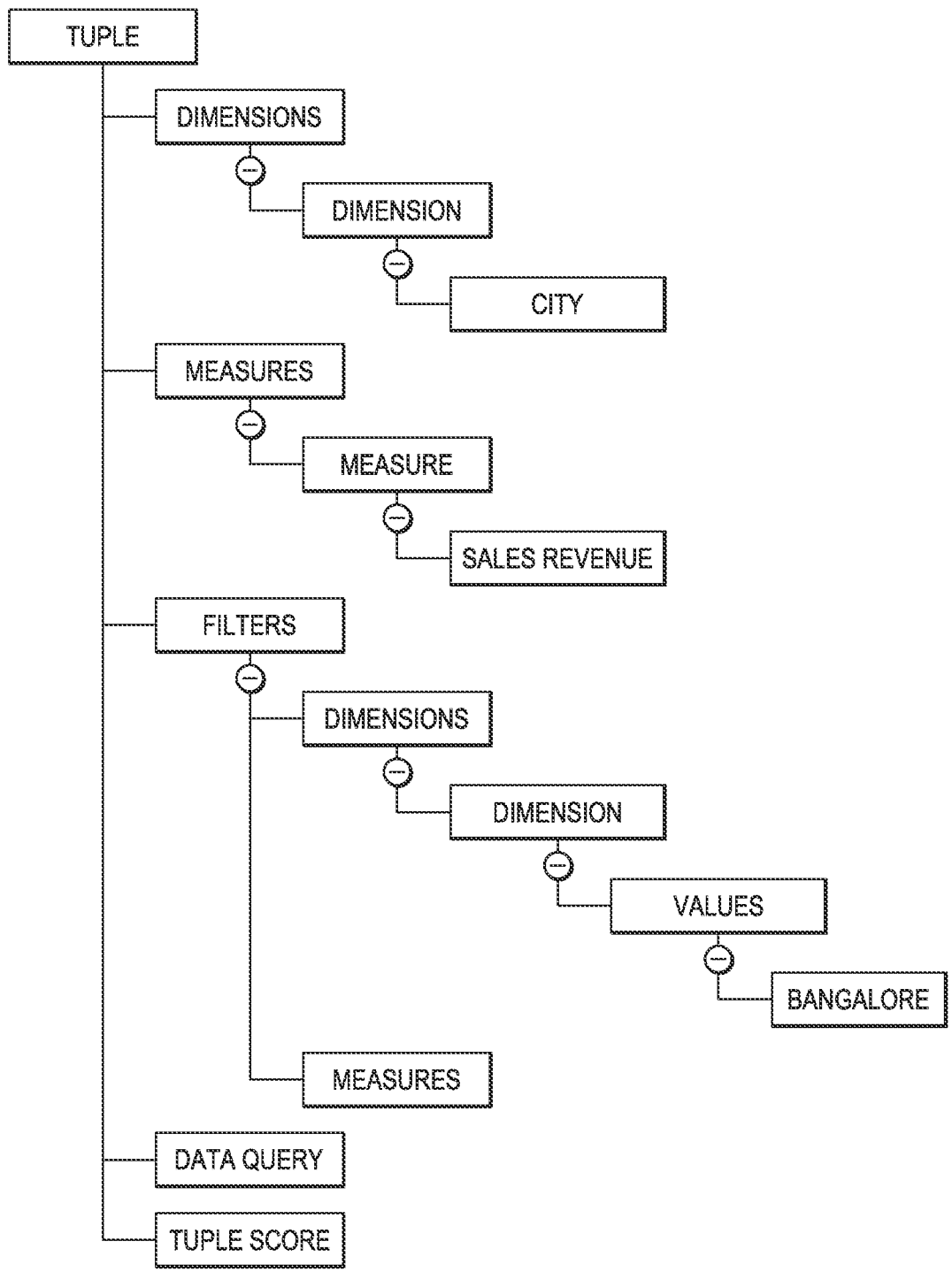

FIG. 9C shows the "TermMatch" object for a tuple that includes a set of dimensions, a measure, a set of filter objects if a tuple is filtered, a tuple score, and a data query (for example, an SQL query). In the "TermMatch" object shown in FIG. 9C, "Dimensions" and "Measure" include metadata information such as display name, aggregation type, data type, and table/column information about data set which a tuple will represent. Every filtered tuple can have "Filters" objects which can include a set of dimensions and measures on which the filter is applied. The "Data Query" can be an SQL like query which can be generated as part of tuple generation. As described below, the "Data query" can be executed on multiple business objects data sources through the data source connection to fetch data items represented by the tuple. In some implementations, the tuple generation engine 812 can determine a tuple score for a given tuple, and use the score for ranking tuples.

The search engine 350 can also include a validity engine 808 that can validate each tuple generated by the tuple generation engine 812, and, in doing so, can check that a generated tuple is valid. The validity engine 808 can determine that a tuple is valid if the validity engine 808 can determine a valid path between a dimension—for example, "City"—and a measure—for example, "Sales Revenue". A valid path can exist if one of the following conditions is true—(1) if both the objects (i.e., the dimension and the measure) belong to the same relational table; or (2) if objects belong to two different tables and there exists a direct/indirect join relationship between the two different tables.

In some implementations, the validity engine 808 can determine that a tuple is valid by implementing the Dijikstra's shortest path algorithm. To do so, the validity engine 808 can build undirected sparse graphs in which every table name belonging to a generated tuple represents a vertex and in which a join between two tables represents an edge between the corresponding vertices. On this graph, the validity engine 808 can implement the Dijikstra's algorithm to determine the shortest path between two edges. If the validity engine 808 determines that no path exists for a given tuple combination, the validity engine 808 can disregard that tuple from further processing from the query. For example, in the query "sales by store name in Bangalore and project," the validity engine 808 can determine that a "Review group" may not have any relation with other objects, and consequently disregard all tuples containing "Review group" resulting in the following valid tuples:
T1={City, Sales revenue}
T2={Store Name, Sales revenue}
T3={City, Store name, Sales revenue}

A pseudo-code that the validity engine 808 can implement to build the graph is shown below:

```
1. Create a undirected graph 'G'
2. Load table information from database to a list tableInfo[ ]
3. Load Join information from database to a list joinInfo[ ]
4. Repeat steps 5 to 6 for every element in the tableinfo.
5. vertex <- tableInfo[i]
6. Add vertex to graph 'G'.
7. Repeat steps 8 to 12 for every element in the joinInfo.
8. Edge <- joininfo[i]
9. If edge already exists in graph
10. Continue
11. Else
12. Add edge to graph "G"
```

In some implementations, the search engine 350 can generate filtered tuples. For example, in the sample query "sales by store name in Bangalore and project", "Bangalore" can match a "City", based on which the search engine 350 can infer that the user is likely looking for data specific to the query term "Bangalore." Thus, rather than or in addition to providing data items that match any value that is included in "City", the search engine 350 can generate filtered tuples that provide data items that match the value "Bangalore". To do so, the search engine 350 can remove the dimensions with value matches from the dimension list of tuples, and apply the filters on match values. For example, the search engine 350 can generate the following filtered tuple: {Store Name, Sales Revenue WHERE City="*Bangalore*"}. In a filtered tuple, the search engine 350 can include wild cards so that variants of "Bangalore" can also be identified as potential value matches. A size of a tuple is the number of unfiltered columns in the tuple. Thus, a filtered tuple differs from an unfiltered tuple in that a size of the filtered tuple will be one column less than a size of the unfiltered tuple. Because filtered tuples represent specific information, a rank of a filtered tuple can be higher than that of an unfiltered tuple.

From the generated tuples, the search engine 350 can generate a data query to obtain data items that match the generated tuples, and consequently satisfy the search query. A data query, for example, can be an SQL query which is generated as part of the tuple generation, and which can be executed on the multiple business objects data sources to obtain data items represented by the tuple. An example of a data query is described below with reference to tuple T3—{City, Store name, Sales Revenue}. This tuple represents that the data items of interest are sales revenue of stores per city. The search engine 350 can generate the following data query, in this example—"select table1.City, table2.Store_name, SUM (table1.sales_revenue) from table1,table2 where table1.key=table2.key group by table1.City, table2.Store_name, table1.sales_revenue". The join condition in the "where" clause of the data query is derived from the Dijikstra's shortest path algorithm, and the data aggregation is accomplished using the aggregate function "SUM" accompanied by "group by" clause. As described below with reference to FIGS. 11A and 11B, the "SUM" function represents an aggregation of measures—the sales revenue information, in this example—which is included in the search results provided in response to receiving the search query.

In some implementations, the data query can be an SQL query when the business objects data source is a relational database. The search engine 350 can generate data queries with different syntaxes for other types of business objects data sources. For example, the search engine 350 can generate data queries, each of which generally includes the following sub-parts:
1. Select Clause—this defines the dimensions and measure for which data items will be retrieved;
2. Where Clause—this defines the filter condition for execution of query and includes the join conditions;
3. Group by Clause—this defines the order of dimensions on which measure is aggregated;
4. Order by Clause—this defines the order of dimensions for the data query.

A pseudo-code that the search engine 350 can implement to generate a data query is shown below:

```
1. Load dimension information to dimensions[ ]
2. Load measure information to measures[ ]
3. For I 1 to n
4. Do
   a. selectClause <- append(dimensions[i],select_delimiter)
   b. orderClause <- append (dimensions[i],order_delimiter)
   c. groupByClause <- append (dimensions[i],groupBy_delimiter)
5. For I 1 to n
6. Do
   a. selectClause <- append(measures[i],select_delimiter)
   b. orderClause <- (measures [i], order_delimiter)
7. Load join information to graph[ ]
8. For I 1 to n
9. Do
   a. whereClause <- append(graph[i].edge.vertex1,join_operator)
   b. whereClause <- append(graph[i].edge.vertex2,join_operator)
   c.
10 .dataQuery <- append(selectClause , whereClause , orderClause , groupByClause )
```

The search engine 350 can also include a ranking engine 810 that can rank multiple tuples according to a relevance to the query terms or the search query or both. In some implementations, to rank the multiple tuples, the ranking engine 810 can implement a scoring mechanism described with reference to the following example. In general, the scoring mechanism can be based on a frequency of a term and on a length normalization. Term frequency refers to a number of times a particular term occurred in a column name or in a column value (or both). Length normalization refers to an association of higher score to an exact match and lower score to partial matches.

For each of three example tuples–T1={City, Sales Revenue}, T2={Category, Sales Revenue}, T3={City, Category, Sales Revenue}, the ranking engine 810 can compute a tuple ranking score using the following two equations:

$$\text{Tuple Score } T_s = \text{TotalScore} * \text{Average(object score)}$$

$$\text{TotalScore score} = \text{SUM(object score)}$$

In the aforementioned equations, "object" refers to each term in each tuple—City, Category, Sales Revenue, in the example above. The ranking engine 810 determines each column name match and each value match for each object in each tuple. To each match, the ranking engine 810 associates a score. The TotalScore score is a sum of individual object scores in the tuple. To the TotalScore score, the ranking engine 810 multiples the Average score for each object to obtain the Tuple Score.

In some implementations, the ranking engine 810 can adjust the scores based on attribute metadata boosting in which the ranking engine 810 can boost matches, for example, exact matches, of query terms to column names. For the example query "Sales Revenue by City," if two matches are found for the query term "City"—for example, an attribute metadata match (column entitled "City" including a multiple city names) and an attribute value match (value including the word "City" in one of the cells in the column)—then, the ranking engine 810 can recognize that the column match is of greater relevance than the value match. Accordingly, the ranking engine 810 can boost the score (for example, multiply the score by a factor such as 1000) to the attribute metadata match to rank the match higher. This boost affects the object score as shown in the equation below:

Object Score OS=ScoreOf(boost(City,1000))

In some implementations, the ranking engine 810 can boost scores calculated for filtered tuples relative to unfiltered tuples because the filtered tuple likely represents a search for more specific data items relative to an unfiltered tuple. Although the search engine 350 retrieves data items that match both the filtered and unfiltered tuples, the search engine 350 boosts the score associated with the filtered tuple relative to the unfiltered tuple. For the example query—"Sales by category in Bangalore"—the tuple generation engine 812 can generate the following three example tuples–T1={City, Sales Revenue}, T2={Category, Sales Revenue}, T3={City, Category, Sales Revenue}. In addition, because the match for the term "Bangalore" is likely a value match, for example, a city name or a store name, the tuple generation engine 812 additionally generates a fourth filtered tuple–T4={Category, Sales Revenue WHERE City like 'Bangalore'}. The ranking engine 812 can associate a higher score to the fourth filtered tuple. The ranking engine 812 can determine a tuple score for the filtered tuple using the equation shown below:

Tuple score Ts=3*Average of(ScoreOf(Sales revenue),ScoreOf(Category),ScoreOf(Boost(City,1000)))

In some implementations, the ranking engine 812 can arrange the multiple tuples in some order of the ranking based on the computed scores. For example, the ranking engine 812 can arrange the multiple tuples in a decreasing order. In some implementations, the search engine 350 can implement pagination of the search results to display a certain number of the ranked results in a first page of the search results and to display the remaining ranked results in one or more additional pages of the search results.

Figure 10:
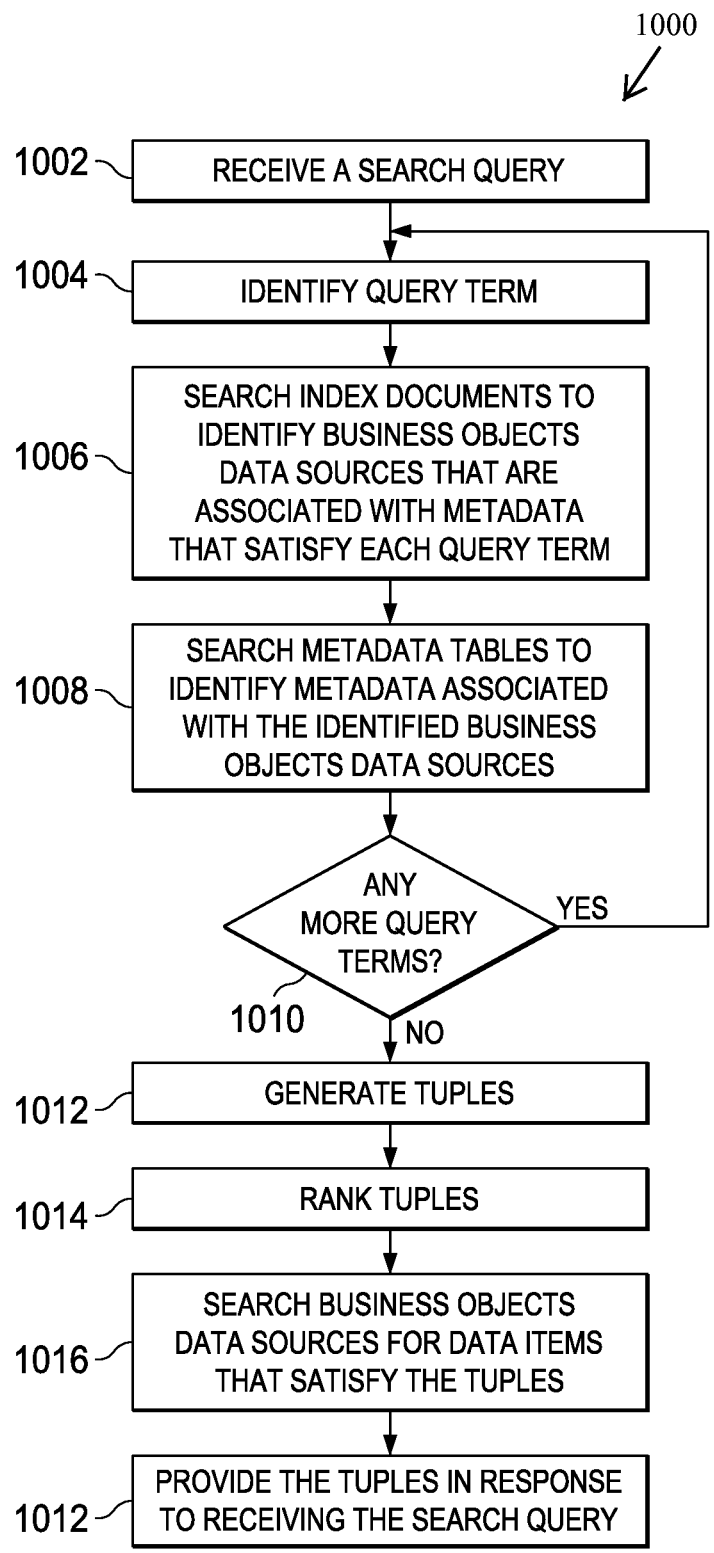
FIG. 10 is a flowchart of an example process implemented by the search engine illustrated in FIG. 9.

FIG. 10 is a flowchart of an example process 1000 implemented by the search engine illustrated in FIG. 9. The process 1000 can be implemented as a non-transitory computer-readable medium storing computer program instructions executable by data processing apparatus to perform the operations. For example, the process 1000 can be implemented by the search engine 350. At 1002, a search query including one or more query terms can be received. Each query term can partially represent metadata. At 1004, a query term can be identified. At 1006, business objects data sources that are each associated with metadata at least partially represented by the identified query term can be identified by searching the index documents. At 1008, metadata associated with the identified one or more business objects data sources can be identified by searching multiple master tables, each of which stores metadata associated with the business objects data sources. At 1010, a check for additional query terms can be made. If additional query terms are available (decision branch "YES"), then the additional term, the business objects data sources, and the metadata can be identified as described above. If no additional query terms are available (decision branch "NO"), then, at 1012, tuples can be generated, and at 1014, the tuples can be ranked based on the identified metadata. At 1016, the business objects data sources can be searched to identify data items that satisfy the tuples. At 1018, the tuples can be provided in response to receiving the search query. In some implementations, identifying business objects data sources and identifying metadata associated with the sources can be performed in parallel for multiple query terms.

Figure 11A:
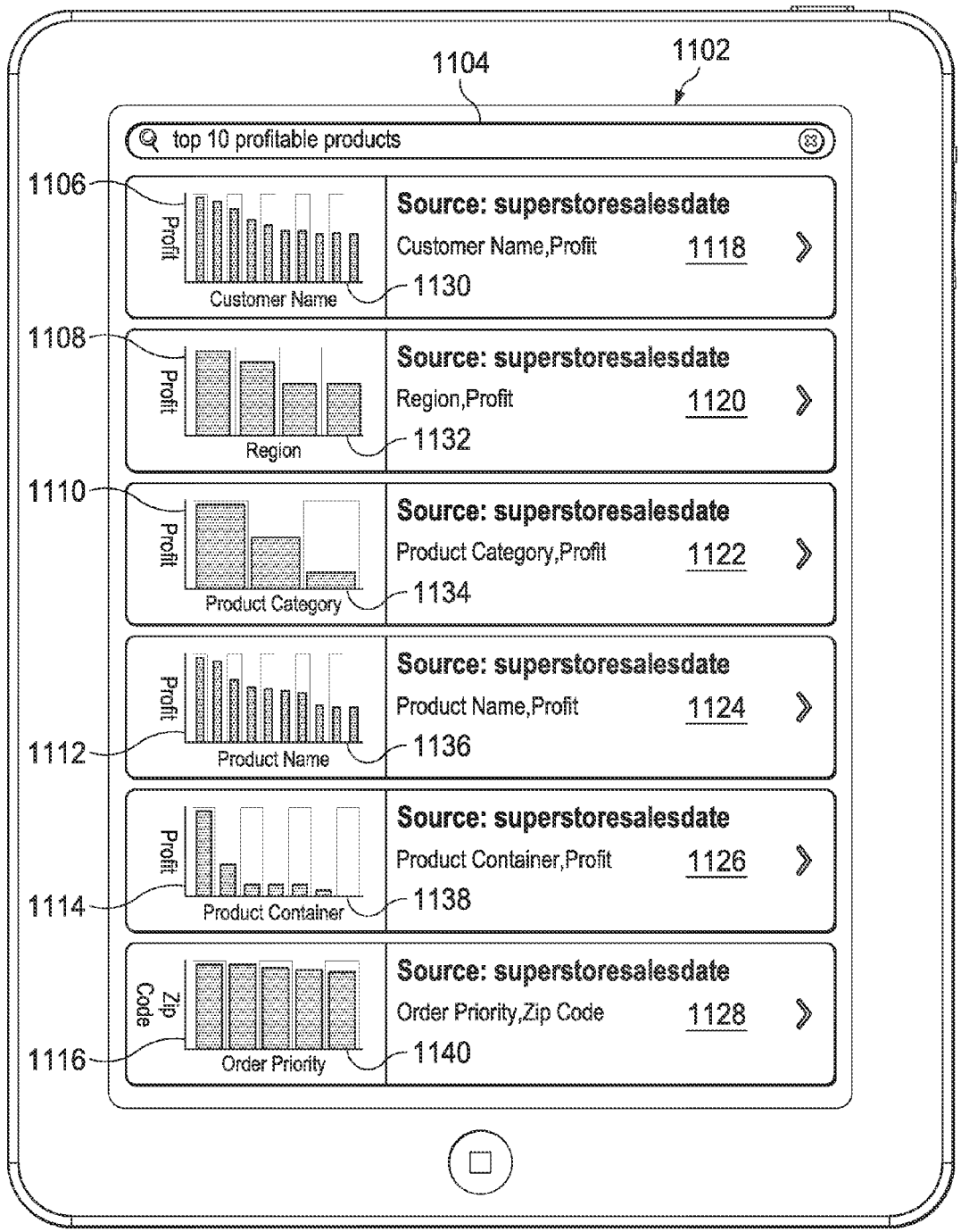
FIGS. 11A and 11B are example user interfaces displaying search queries and search results.
Figure 11B:
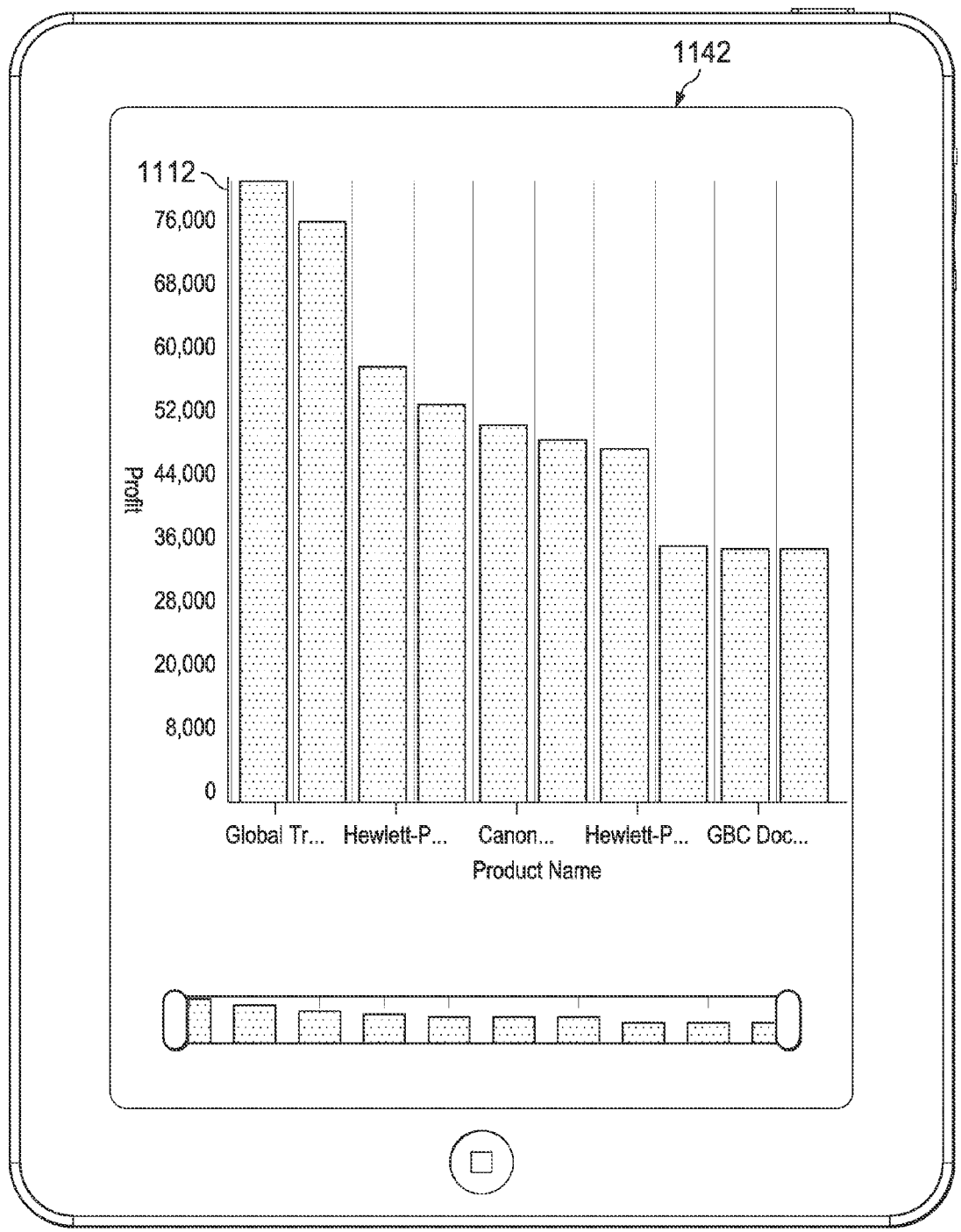

FIGS. 11A and 11B are example user interfaces displaying search queries and search results. FIG. 11A shows a user interface 1102 displayed on a client system (for example, the first client system 102). The user interface 1104 includes a first region 1104—for example, a textbox—into which a user of the client system can enter a search query, for example, "top 10 profitable products." The business objects engine 124 can receive the search query entered in the first region 1104 and, by implementing the methods described above, provide multiple search results in response. In some implementations, the client system can display the multiple search results (a first search result 1106, a second search result 1108, a third search result 1110, a fourth search result 1112, a fifth search result 1114, and a sixth search result 1116) together with the first region 1104 in the user interface 1102. In some implementations, in each search result, the business objects engine 124 can display a source region (a first source region 1118, a second source region 1120, a third source region 1122, a fourth source region 1124, a fifth source region 1126, and a sixth source region 1128) that displays a name of the business objects data source from which the data items that satisfy the search query were retrieved and the names of the columns in the business objects data source that match the received query. For example, in the first search result 1106, the first region 1118 displays "superstoresalesdate" as the name of the data source and "Customer Name, Profit" as names of matching columns. In some implementations, the business objects engine 124 can additionally display result objects (a first result object 1130, a second result object 1132, a third result object 1134, a fourth result object 1136, a fifth result object 1138, and a sixth result object 1140) in each search result. A search result object can be, for example, a graph representing the data items that satisfy the search query. Each result object is selectable such that selecting the object will cause the business objects engine 124 to display a new user interface 1142 in the client system (FIG. 11B). In the new user interface 1142, the client system can display the selected result object, for example, result object 1112.

In some implementations, in response to receiving a search query, for example, "sales in Texas," the search engine 350 can determine that "sales" refers to "Sales Revenue" and "Texas" refers to "State." In such situations, the business objects engine 124 can provide five search results, each representing sales in a particular state including Texas. The four states other than Texas can represent states that have top sales revenues. By doing so, the business objects engine 124 can enable the user to compare numerical values in the state that the user specified with corresponding values in states with highest numerical values. The number of search results—five, in this example—is variable. Further, if the query specifies two states, for example, "sales in Texas and Maryland," the business objects engine 124 can provide sales revenue for the states specified in the search query and additionally for three states with highest sales revenue.

In some implementations, the business objects engine 124 can implement an auto-aggregation function in the data query to automatically display an aggregation of numerical values included in the search results. For example, in the aforementioned example, the business objects engine 124 can determine a sum of sales revenue for the five states included in the search results by implementing an auto-aggregation clause in the data query, and display the sum in the search results. In another example, if the search query pertains to numerical values associated with each of multiple stores, the business objects engine 124 can display the numerical values for each store and additionally display an aggregation of the numerical values. In the data query generation described above, the aggregate function for a measure will be obtained from the metadata information which, in turn, will be derived from "semantic information." Also, in the data query, "SUM" represents the auto-aggregation function.

In some implementations, the business objects engine 124 can provide temporal search results based on the search query. For example, if the search query includes a temporal query term, for example, "sales in Texas 2011," then the business objects engine 124 can recognize "2011" as a temporal term. In such situations, in addition to providing search results associated with 2011, the business objects engine 124 can additionally provide search results associated with multiple, for example, five, preceding years. To do so, the business objects engine 124 can recognize a time dimension in the search query and generate an appropriate SQL query, for example, one that includes an "order by" time clause rather than an "order by" measure clause.

In sum, the business objects engine 124 represents a search system that enables a user of a client system to perform unbounded searches while minimizing or eliminating the need to create pre-defined queries or reports. The business objects engine 124 can search multiple business objects data sources for matches to the search query. To do so, the business objects engine 124 can implement an index schema that includes a file-based search index (for example, an inverted index) and a relational database which can enhance search performance. The business objects engine 124 can generate tuples, which can be information blocks that include combinations of matching columns using which a user of a client system can find data items that match the search query. The business objects engine 124 can additionally rank the generated tuples to provide relevant results in response to receiving the search query.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium, for example, the computer-readable medium 106, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (e.g., multiple CDs, disks, or other storage devices).

The operations described in this specification can be implemented as operations performed by a data processing apparatus, for example, data processing apparatus 108, on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network, for example, network 126. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Semantic Abstraction is the term for a semantic layer that describes an underlying base data source. A semantic abstraction can be a level of abstraction based on a relational, Online Analytical Processing (OLAP), or other data source or a combination of more than one existing semantic layers. A universe is a specific form of semantic abstraction where the semantic abstraction includes data model objects that describe the underlying data source and define dimensions, attributes, and measures that can be applied to the underlying data source and data foundation metadata that describes a connection to, structure for, and aspects of the underlying data source. A data model object is an object defined within a semantic domain that represents a dimension of the underlying data source, represents relationships between dimensions members and attributes, or provides calculations from, based on or designed to be applied to an underlying data source. Typically, in a universe, a data model object is assigned a common business term such that the user does not need to understand the specific logic of the underlying data source but can work with familiar terminology when constructing queries or otherwise accessing the data. Examples of common business terms include: customer, employer, product line, revenue, profit, attrition, fiscal year, quarter, and the like.

While this specification contains many specific implementation details, these should not be construed as limitations on the scope of any implementations or of what may be claimed, but rather as descriptions of features specific to particular implementations of particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method to index business objects data sources for searching, the method comprising:

accessing a plurality of business objects data sources, each business objects data source storing a plurality of data items;

for each business objects data source, generating a plurality of computer-searchable index documents including a first search index document associated with a respective business objects data source and a plurality of second search index documents, each second search index document associated with each data item of the plurality of data items stored in the respective business objects data source, and generating a plurality of computer-readable master tables including a first master table storing metadata of the respective business objects data source and a plurality of second master tables, each second master table storing metadata describing the plurality of data items stored in the respective business objects data source;

storing in the first master table a name of the respective business objects data source and an identifier that uniquely identifies the respective business objects data source;

providing the plurality of computer-searchable index documents and the plurality of computer-readable master tables to perform a search for data items in the plurality of business objects data sources;

representing the respective business objects data source in a table format that includes one or more tables, each table including one or more columns, each column including one or more cells, each cell storing a data item of the plurality of data items stored in the respective business objects data source;

generating a third master table storing metadata of the one or more tables; and including in the third master table, a name of each of the one or more tables.

2. The method of claim 1, further comprising:

generating a plurality of computer-readable mapping tables, each mapping table storing mapping associated with the respective business objects data source; and providing the plurality of computer-readable mapping tables to perform the search for data items.

3. The method of claim 2, wherein at least a portion of the plurality of master tables is a duplication of at least a portion of the plurality of computer-searchable index documents, and wherein the plurality of computer-readable master tables and the plurality of computer-readable mapping tables are stored in a relational database.

4. The method of claim 1, wherein generating the plurality of computer-searchable index documents comprises:

generating a respective first search index document for each table;

generating a respective second search index document for each cell; and generating a respective third search index document for each column.

5. The method of claim 4, further comprising, storing the plurality of computer-searchable index documents in an inverted index data structure.

6. The method of claim 1, further comprising storing in each second master table, a data type and an analysis type of each data item of the plurality of data items stored in the respective business objects data source.

7. The method of claim 1, wherein generating a plurality of computer-readable mapping tables, each mapping table storing mapping associated with the respective business objects data source, comprises:

generating a table-to-table mapping tables storing join data;

generating a table-to-object mapping table storing a mapping between a particular table and one or more columns included in the particular table;

generating an index document-table mapping table storing mapping between a particular index document and a particular table indexed by the particular index document;

generating an index document-object mapping table storing mapping between the particular index document and one or more particular columns in the particular table; and generating a data source-to-table mapping storing mapping between a respective business objects data source and tables including the particular table.

8. The method of claim 1, wherein at least a portion of the plurality of computer-searchable index documents and at least a portion of the plurality of master tables are generated in parallel or wherein at least a portion of the plurality of master tables and at least a portion of the plurality of mapping tables are generated after and based on at least a portion of the plurality of computer-searchable index documents.

9. The method of claim 1, wherein accessing the plurality of business objects data sources, each business objects data source storing a plurality of data items comprises:

crawling each business objects data source; and extracting metadata from each business objects data source.

10. A non-transitory computer-readable medium tangibly encoding computer program instructions executable by data processing apparatus to perform operations comprising:

accessing a plurality of business objects data sources, each business objects data source storing a plurality of data items;

for each business objects data source, generating a plurality of computer-searchable index documents including a first search index document associated with a respective business objects data source and a plurality of second search index documents, each second search index document associated with each data item of the plurality of data items stored in the respective business objects data source, and generating a plurality of computer-readable master tables including a first master table storing metadata of the respective business objects data source and a plurality of second master tables, each second master table storing metadata describing the plurality of data items stored in the respective business objects data source;

storing in the first master table a name of the respective business objects data source and an identifier that uniquely identifies the respective business objects data source;

providing the plurality of computer-searchable index documents and the plurality of computer-readable master tables to perform a search for data items in the plurality of business objects data sources;

representing the respective business objects data source in a table format that includes one or more tables, each table including one or more columns, each column including one or more cells, each cell storing a data item of the plurality of data items stored in the respective business objects data source;

generating a third master table storing metadata of the one or more tables; and including in the third master table, a name of each of the one or more tables.

11. The medium of claim 10, the operations further comprising:

generating a plurality of computer-readable mapping tables, each mapping table storing mapping associated with the respective business objects data source; and providing the plurality of computer-readable mapping tables to perform the search for data items.

12. The medium of claim 11, wherein at least a portion of the plurality of master tables is a duplication of at least a portion of the plurality of computer-searchable index documents, and wherein the plurality of computer-readable master tables and the plurality of computer-readable mapping tables are stored in a relational database.

13. The medium of claim 10, wherein generating the plurality of computer-searchable index documents comprises:
  generating a respective first search index document for each table;
  generating a respective second search index document for each cell; and
  generating a respective third search index document for each column.

14. The medium of claim 13, the operations further comprising, storing the plurality of computer-searchable index documents in an inverted index data structure.

15. The medium of claim 10, the operations further comprising storing in each second master table, a data type and an analysis type of each data item of the plurality of data items stored in the respective business objects data source.

16. The medium of claim 10, wherein generating a plurality of computer-readable mapping tables, each mapping table storing mapping associated with the respective business objects data source, comprises:
  generating a table-to-table mapping tables storing join data;
  generating a table-to-object mapping table storing a mapping between a particular table and one or more columns included in the particular table;
  generating an index document-table mapping table storing mapping between a particular index document and a particular table indexed by the particular index document;
  generating an index document-object mapping table storing mapping between the particular index document and one or more particular columns in the particular table; and
  generating a data source-to-table mapping storing mapping between a respective business objects data source and tables including the particular table.

17. The medium of claim 10, wherein at least a portion of the plurality of computer-searchable index documents and at least a portion of the plurality of master tables are generated in parallel or wherein at least a portion of the plurality of master tables and at least a portion of the plurality of mapping tables are generated after and based on at least a portion of the plurality of computer-searchable index documents.

18. The medium of claim 10, wherein accessing the plurality of business objects data sources, each business objects data source storing a plurality of data items comprises:
  crawling each business objects data source; and
  extracting metadata from each business objects data source.

19. A system comprising:
  one or more data processing apparatus; and
  a non-transitory computer-readable medium tangibly encoding computer program instructions executable by the one or more data processing apparatus to perform operations comprising:
    accessing a plurality of business objects data sources, each business objects data source storing a plurality of data items;
    for each business objects data source, generating a plurality of computer-searchable index documents including a first search index document associated with a respective business objects data source and a plurality of second search index documents, each second search index document associated with each data item of the plurality of data items stored in the respective business objects data source, and
    generating a plurality of computer-readable master tables including a first master table storing metadata of the respective business objects data source and a plurality of second master tables, each second master table storing metadata describing the plurality of data items stored in the respective business objects data source;
    storing in the first master table a name of the respective business objects data source and an identifier that uniquely identifies the respective business objects data source;
    providing the plurality of computer-searchable index documents and the plurality of computer-readable master tables to perform a search for data items in the plurality of business objects data sources;
    representing the respective business objects data source in a table format that includes one or more tables, each table including one or more columns, each column including one or more cells, each cell storing a data item of the plurality of data items stored in the respective business objects data source;
    generating a third master table storing metadata of the one or more tables; and
    including in the third master table, a name of each of the one or more tables.

20. The system of claim 19, the operations further comprising:
  generating a plurality of computer-readable mapping tables, each mapping table storing mapping associated with the respective business objects data source; and
  providing the plurality of computer-readable mapping tables to perform the search for data items.

21. The system of claim 20, wherein at least a portion of the plurality of master tables is a duplication of at least a portion of the plurality of computer-searchable index documents, and wherein the plurality of computer-readable master tables and the plurality of computer-readable mapping tables are stored in a relational database.

22. The system of claim 19, wherein generating the plurality of computer-searchable index documents comprises:
  generating a respective first search index document for each table;
  generating a respective second search index document for each cell; and
  generating a respective third search index document for each column.

23. The system of claim 22, the operations further comprising, storing the plurality of computer-searchable index documents in an inverted index data structure.

24. The system of claim 19, the operations further comprising storing in each second master table, a data type and an analysis type of each data item of the plurality of data items stored in the respective business objects data source.

25. The system of claim 19, wherein generating a plurality of computer-readable mapping tables, each mapping table storing mapping associated with the respective business objects data source, comprises:
  generating a table-to-table mapping tables storing join data;
  generating a table-to-object mapping table storing a mapping between a particular table and one or more columns included in the particular table;
  generating an index document-table mapping table storing mapping between a particular index document and a particular table indexed by the particular index document;

generating an index document-object mapping table storing mapping between the particular index document and one or more particular columns in the particular table; and generating a data source-to-table mapping storing mapping between a respective business objects data source and tables including the particular table.

26. The system of claim 19, wherein at least a portion of the plurality of computer-searchable index documents and at least a portion of the plurality of master tables are generated in parallel or wherein at least a portion of the plurality of master tables and at least a portion of the plurality of mapping tables are generated after and based on at least a portion of the plurality of computer-searchable index documents.

27. The system of claim 19, wherein accessing the plurality of business objects data sources, each business objects data source storing a plurality of data items comprises:

crawling each business objects data source; and extracting metadata from each business objects data source.

\* \* \* \* \*